(12) United States Patent
Morton et al.

(10) Patent No.: US 10,739,370 B2
(45) Date of Patent: Aug. 11, 2020

(54) METHOD AND APPARATUS FOR MONITORING FLUID DYNAMIC DRAG

(71) Applicant: 1323079 Alberta Ltd., Calgary (CA)

(72) Inventors: Chris Morton, Calgary (CA); Kelly Zwarych, Calgary (CA)

(73) Assignee: 1323079 Alberta Ltd., Calgary (CA)

( * ) Notice: Subject to any disclaimer, the term of this patent is extended or adjusted under 35 U.S.C. 154(b) by 0 days.

(21) Appl. No.: 16/302,768

(22) PCT Filed: May 18, 2017

(86) PCT No.: PCT/CA2017/050604
§ 371 (c)(1),
(2) Date: Nov. 19, 2018

(87) PCT Pub. No.: WO2017/197524
PCT Pub. Date: Nov. 23, 2017

(65) Prior Publication Data
US 2019/0301969 A1    Oct. 3, 2019

Related U.S. Application Data

(60) Provisional application No. 62/338,859, filed on May 19, 2016.

(51) Int. Cl.
*G01P 5/16* (2006.01)
*G01M 9/06* (2006.01)
(Continued)

(52) U.S. Cl.
CPC ............. *G01P 5/16* (2013.01); *G01M 9/065* (2013.01); *G01P 5/165* (2013.01); *G01P 21/025* (2013.01)

(58) Field of Classification Search
CPC ........ G01M 9/06; G01M 9/065; G01M 9/067; G01P 5/16; G01P 5/165
(Continued)

(56) References Cited

U.S. PATENT DOCUMENTS 5,423,209 A    6/1995  Nakaya et al.
6,940,425 B2   9/2005  Frantz
(Continued)

FOREIGN PATENT DOCUMENTS

WO    2007-038278 A3    4/2006
WO    2009-055472 A1    4/2009
(Continued)

OTHER PUBLICATIONS

Newman, *Marine Hydrodynamics*, § 4.13, 139, MIT Press, Aug. 1977.
(Continued)

*Primary Examiner* — Nathaniel J Kolb
(74) *Attorney, Agent, or Firm* — Young Basile Hanlon & MacFarlane, P.C.

(57) ABSTRACT

Methods and apparatus for monitoring fluid-dynamic drag on an object, such as a bicycle, ground vehicle, watercraft, aircraft, or portion of a wind turbine are provided. An array of sensors obtain sensor readings for example indicating: power input for propelling the object; air speed and direction relative to motion of the object; and ground speed of the object. Sensor readings may also indicate: temperature; elevation and humidity for providing a measurement of air density. Sensor readings may also indicate inclination angle and forward acceleration. Processing circuitry determines a coefficient of drag area based on the sensor readings and optionally one or more stored parameters, according to a predetermined relationship. A pitot tube based apparatus for measuring fluid speed and direction is also provided. Methods for dynamic in situ calibration of the pitot tube apparatus, and of adjusting correction factors applied to correct measurement errors of this apparatus are also provided.

18 Claims, 17 Drawing Sheets

(51) Int. Cl.
*G01P 5/165* (2006.01)
*G01P 21/02* (2006.01)

(58) Field of Classification Search
USPC .......................................................... 702/182
See application file for complete search history.

(56) References Cited

U.S. PATENT DOCUMENTS

| | | | | |
|---|---|---|---|---|
| 7,480,548 | B2 | 1/2009 | Shigemi et al. | |
| 8,612,165 | B2* | 12/2013 | Froncioni | G01M 9/06 |
| | | | | 702/45 |
| 8,960,018 | B2 | 2/2015 | Stehle | |
| 9,188,496 | B2* | 11/2015 | DeGolier | G01L 1/247 |
| 9,275,504 | B1* | 3/2016 | Cooper | G07C 1/22 |
| 10,060,738 | B2* | 8/2018 | Fyfe | G01B 21/32 |
| 2011/0081981 | A1 | 4/2011 | Okamoto | |
| 2012/0221257 | A1* | 8/2012 | Froncioni | G06F 7/00 |
| | | | | 702/45 |
| 2013/0054143 | A1* | 2/2013 | DeGolier | G01L 1/247 |
| | | | | 702/3 |
| 2014/0130608 | A1* | 5/2014 | Adams | G06F 3/0346 |
| | | | | 73/861.66 |
| 2014/0230571 | A1 | 8/2014 | Pape et al. | |
| 2016/0273983 | A1* | 9/2016 | Grengs | A43B 3/0015 |
| 2017/0074897 | A1* | 3/2017 | Mermel | G09B 19/0038 |
| 2017/0248420 | A1* | 8/2017 | Fyfe | B62M 3/16 |
| 2018/0364038 | A1* | 12/2018 | Fyfe | B62M 3/16 |

FOREIGN PATENT DOCUMENTS

| | | | |
|---|---|---|---|
| WO | 2013/001656 A1 | 1/2013 | |
| WO | WO-2016030768 A2 * | 3/2016 | ............ G01L 5/162 |
| WO | 2017-197524 A1 | 11/2017 | |

OTHER PUBLICATIONS

*Road Load Measurement and Dynamometer Simulation Using Coastdown Techniques*, J1263, Society of Automotive Engineers, 1996.

Odar et al., *Forces on a Sphere Accelerating in a Viscous Fluid*, J. Fluid Mech., 18(2), 302-14, Feb. 1964.
Faria, *The Science of Cycling Factors Affecting Performance—Part 2*, Sports Med., 35(4), 313-37 (2005) (quoting Burke et al., *Medical, and Scientific Aspects of Cycling*, 235-51, 1988).
Martin et al., *Validation of a Mathematical Model for Road Cycling Power*, J. App. Biomech., 14(3), 276-91, Aug. 1998.
Johansen et al., *The Compressible Calibration of Miniature Multi-Hole Probes*, J. Fluids Eng., 123(1), 128-38, Sep. 6, 2001.
Snyder & Schmidt, *Determination of Drag Parameters Utilizing a Bicycle Power Meter*, Human Powered eJournal, 5(1), Oct. 21, 2004.
Martin et al., *Aerodynamic Drag Area of Cyclists with Field-Based Measures*, Sportscience, 10, 68-9, Dec. 2006.
Chung, *Estimating CdA with a Power Meter*, Mar. 2012.
*iBike CdA Measurements Instruction Manual*, Velocomp LLP, Mar. 2013.
Guzik, et al., *The all-new Speed Concept*, Jul. 2013.
EngineersTalk, *Yaw Angle Measurement in Real Conditions on Kona Ironman Course*, https://engineerstalk.mavic.com/en/yaw-angle-measurement-in-real-conditions-on-kona-ironman-course/, Oct. 16, 2013.
International Preliminary Report on Patentability (PCT Chapter II), PCT/CA2017/050604, dated Aug. 31, 2018.
Wikipedia, *Added Mass*, https://en.wikipedia.org/wiki/Added_mass, last accessed Feb. 27, 2019.
Office Action dated Apr. 17, 2019 (Corresponding Canadian Application No. 3,024,560).
Office Action dated Jul. 22, 2019 (Corresponding Canadian Application No. 3,024,560).
Office Action dated Mar. 12, 2020 (Corresponding Canadian Application No. 3,024,560).
Office Action dated Jul. 17, 2019 (Corresponding Canadian Application No. 3,043,733).
Office Action dated Sep. 25, 2019 (Corresponding Canadian Application No. 3,043,733).
Extended European Search Report dated Feb. 3, 2020 (Corresponding European Application No. 17798461.4).
Office Action dated May 11, 2020 (corresponding Canadian Patent Application No. 3,043,733).

* cited by examiner

METHOD AND APPARATUS FOR MONITORING FLUID DYNAMIC DRAG

FIELD OF THE INVENTION

The present invention pertains to the field of aerodynamic measurement and in particular to a method and apparatus for monitoring fluid-dynamic (e.g. aerodynamic) drag on an object using an array of sensors.

BACKGROUND

One of the most sought out quantities in aerodynamic performance measurements of human powered vehicles (e.g., a bicycle) is the drag force acting on the vehicle. Under controlled conditions of high quality low speed wind tunnel facilities, it is possible to perform such measurements in order to find the most suitable vehicle and body position for minimal aerodynamic drag. Aerodynamic analysis of other objects, such as but not limited to ground-based and airborne vehicles, can be similarly performed.

U.S. Pat. No. 8,612,165 discloses a method and system for measuring aerodynamic properties of objects, including determining the dependence of a drag area of an object upon airflow yaw angle and direction. However, this approach requires data to be collected over an entire vehicle trip and analyzed by the computation of multiple virtual elevation profiles to determine a "best fitting" relationship between aerodynamic drag area and airflow yaw angle.

International Patent Application Publication No. WO 2007/038278 discloses an apparatus for measuring static and dynamic pressure and speed and acceleration of a vehicle, in order to calculate power expended to move the vehicle. However, the relationship between wind yaw angle and aerodynamic drag is not fully considered. In addition, the disclosed approach does not adequately accommodate aggressive cross-wind scenarios, or conditions where the vehicle is undergoing significant accelerations or decelerations.

U.S. Pat. No. 9,188,496 discloses a system and method of calculating under changing conditions in real-time aerodynamic drag acting on a rider on a vehicle. However, this methodology and application relies on real-time analysis of one or more force sensors at points of contact between the rider and the vehicle and does not attempt to provide a measurement of wind speed and wind yaw angle.

Therefore there is a need for a method and apparatus for monitoring and/or determining fluid-dynamic (e.g. aerodynamic) drag on an object, using sensors, that is not subject to one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for monitoring fluid-dynamic (e.g. aerodynamic) drag on an object, such as a bicycle or other ground vehicle powered by a human or other power source, airborne vehicles, watercraft, remote control vehicles, wind turbines, or other objects moving relative to an ambient fluid. In accordance with embodiments of the present invention, there is provided a method for determining fluid-dynamic drag on an object, comprising: obtaining sensor readings indicative of: power input for propelling the object; air/fluid speed and direction relative to the object; and speed and direction of the object in a fixed reference frame (e.g. ground speed and direction); and determining, using a computer, a coefficient of drag area based on the sensor readings and optionally one or more stored parameters, according to a predetermined relationship. Optionally, the sensor readings are further indicative of one or more of: temperature; elevation and humidity, said sensor readings of temperature, elevation and humidity combined to provide a measurement of air/fluid density. Optionally, the sensor readings are further indicative of inclination angle and forward acceleration, and wherein the stored parameters are indicative of at least weight or mass of the object plus load carried thereby.

In accordance with embodiments of the present invention, there is provided an apparatus for determining fluid-dynamic drag on an object, comprising: a set of sensors configured to provide sensor readings indicative of: power input for propelling the object; air speed and direction relative to the object; and speed and direction of the object in a given reference frame; and a processor operatively coupled to the set of sensors and to a memory, the processor configured to determine a coefficient of drag area based on the sensor readings and optionally one or more stored parameters, according to a predetermined relationship; and an interface configured to provide the determined coefficient of drag area to a user.

In accordance with embodiments of the present invention, there is provided an apparatus for measuring fluid speed and direction, comprising: a multi-hole pitot probe whose basic calibration is completed using wind tunnel measurements and adjustments to the calibration for each device are applied in-situ using a pre-defined algorithm.

In accordance with embodiments of the present invention, there is provided a method for determining fluid dynamic drag on an object, comprising: obtaining sensor readings from one or a combination of sensors, the sensor readings indicative of external thrust forces and/or resistive forces applied to the object; and determining, using a computer, a coefficient of drag area based on the sensor readings and optionally one or more stored parameters, according to a predetermined relationship.

In accordance with embodiments of the present invention, there is provided an apparatus for determining fluid-dynamic drag on an object, comprising: a set of sensors configured to provide sensor readings indicative of external thrust forces and/or resistive forces applied to the object; and processing circuitry operatively coupled to the set of sensors, the processing circuitry configured to determine a coefficient of drag area based on the sensor readings and optionally one or more stored parameters, according to a predetermined relationship; and an interface configured to provide the determined coefficient of drag area to a user.

In accordance with embodiments of the present invention, there is provided an apparatus for measuring fluid speed and direction, comprising: at least a first pitot tube, a second pitot tube and a third pitot tube, each pitot tube having a respective pressure port, the pressure ports facing in different directions; a first differential pressure transducer operatively coupled to the first pitot tube and the second pitot tube for providing a first measurement of differential pressure between the first pitot tube and the second pitot tube; and a second differential pressure transducer operatively coupled to the first pitot tube and the third pitot tube for providing a second measurement of differential pressure between the first pitot tube and the third pitot tube.

In accordance with embodiments of the present invention, there is provided a method for calibrating a multi-hole pitot probe wind sensor, comprising: receiving an indication of a body proximate to the probe; estimating a flow field induced by the presence of the body at least in the vicinity of the probe; performing computations related to a superposition of the estimated flow field onto another flow field for the probe; estimating a measurement error induced in the probe by the body, the estimate based on the superposition; and providing a correction factor for at least partially countering the measurement error.

In accordance with embodiments of the present invention, there is provided a method for calibrating a multi-hole pitot probe wind sensor, comprising: providing a set of one or more configurations for a body proximate to the probe; for each of the set of configurations, experimentally determining a measurement error induced in the probe by the body and providing a correction factor for at least partially countering the measurement error.

In accordance with embodiments of the present invention, there is provided a method for operating a multi-hole pitot probe wind sensor, comprising: receiving an indication of relative location and/or shape of a body proximate to the probe; and providing a correction factor to be applied to measurements from the probe based on the received indication.

In accordance with embodiments of the present invention, there is provided an apparatus for determining rolling resistance exerted by a surface on a wheeled object, the apparatus comprising: a vibration sensor configured to measure vibrations due to rolling of the wheeled object on the surface; processing circuitry operatively coupled to the vibration sensor, the processing circuitry configured to determine a coefficient of rolling resistance based on the measured vibrations and one or more stored parameters, according to a predetermined relationship.

In accordance with embodiments of the present invention, there is provided a method for determining rolling resistance exerted by a surface on a wheeled object, the method comprising: measuring, using a vibration sensor, vibrations due to rolling of the wheeled object on the surface; determining, using a computer, a coefficient of rolling resistance based on the measured vibrations and one or more stored parameters, according to a predetermined relationship.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
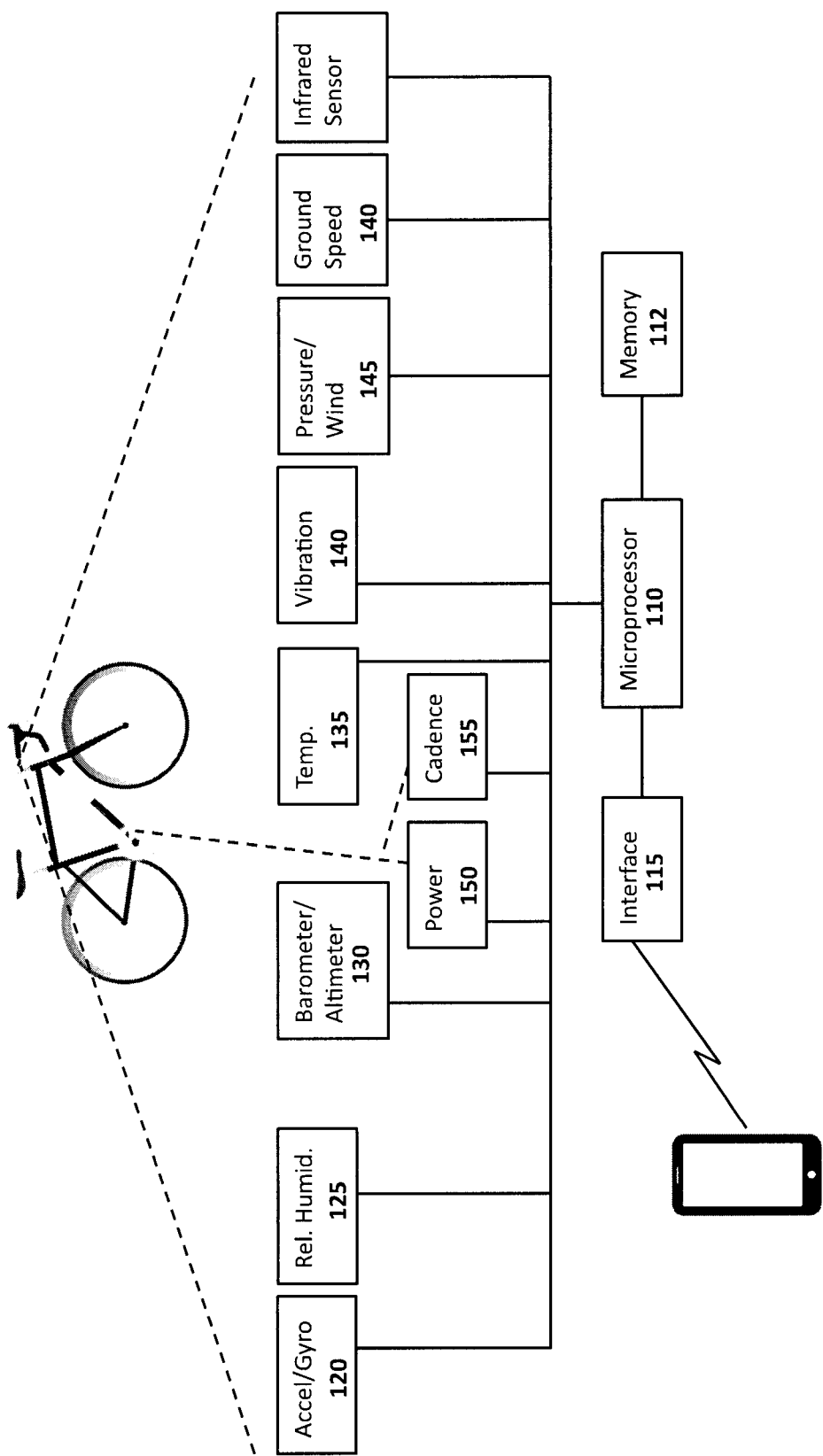
FIG. 1 schematically illustrates an apparatus according to an embodiment of the present invention.

Embodiments of the present invention provide a field-based fluid-dynamic (e.g. aerodynamic) measurement method and apparatus in which sensors mounted on an object are used to register information on the object's fluid-dynamic performance. The information may be registered in real time and updated as conditions change. Output from the sensors is used at least in part to estimate the resistance caused by fluid-dynamic drag on the object in real-time. The object may be a human-powered vehicle such as a bicycle, or another object of interest which moves relative to a fluid such as air. Although the term "air" is used herein, it should be readily understood that air can refer to one of a variety of fluid media through which an object can move, such as a gaseous or possibly liquid fluid medium.

For a human-powered vehicle such as a bicycle, this allows information to be gathered on fluid-dynamic performance for a variety of human body positions. Such information is useful because the human body position presenting the least drag is not necessarily the same position which allows the most efficient power production for driving the vehicle. By comparing power and fluid-dynamic information for different body positions, desirable trade-offs between power and drag can be found.

Embodiments of the present invention employ a wind measurement device which simultaneously determines wind yaw angle and wind speed magnitude. Direct force power meter measurements are used as one of a plurality of inputs for computing estimated fluid-dynamic drag coefficients. In various embodiments, rather than estimating the input power to the vehicle using on-board sensors, vehicle driving power is measured directly via sensors such as strain gauge sensors. Fluid-dynamic drag is then estimated using this power measurement.

Embodiments of the present invention obtain and use measurements of wind magnitude, wind yaw angle, road slope, vehicle acceleration, vehicle speed and direction in a given reference frame (e.g. ground speed and direction), rolling resistance estimate, drivetrain resistance estimate, vehicle and passenger weight, vehicle and passenger position estimates, and vehicle input power. The measurements are combined together to estimate the fluid-dynamic drag of the vehicle.

Embodiments of the present invention provide for and utilize a particular design of a three-hole, or five-hole pitot tube sensor for directly measuring wind speed and wind yaw angle. However, it is noted that other embodiments of the present invention can provide for alternative multi-hole probe technologies in place of this particular design. In one embodiment of the present invention the multi-hole probe is configured to provide omnidirectional wind speed measurement and heading.

Embodiments of the present invention provide for and utilize a combination of vibration or accelerometer sensors and pressure sensors (with knowledge of vehicle weight and tire type) for the detection of instantaneous changes in road surface condition and associated rolling resistance coefficients.

Embodiments of the present invention provide for and utilize a combination of humidity sensors, temperature sensors, and heart rate sensors for estimation of metabolic function, specifically sweat rate, electrolyte loss, and net fluid loss of a human providing driving power of a vehicle such as a bicycle. Alternative sensors indicative of sweat rate, heart rate, or the like, or a combination thereof, may be used to facilitate estimates of metabolic performance. As such, embodiments of the present invention relate to monitoring metabolic performance of a person powering a vehicle, including acquiring and processing relevant sensor measurements.

Embodiments of the present invention provide for a sensing and computing device that may be integrated into existing technology of human powered vehicles. For example, a cycling computer can be provided which, in addition to recording parameters such as speed, cadence, heart rate, elevation, temperature, input power, and heading, also obtains sensor information for providing instantaneous or near-instantaneous estimates of the aerodynamic drag force exerted on the vehicle in combination with the rider.

Embodiments of the present invention provide for a method determining fluid-dynamic drag on an object. The method includes obtaining data from one or more sensors and processing the data using processing circuitry. The processing circuitry can include, for example, a computer microprocessor, digital or analog processing circuitry for example as embodied in an application specific integrated circuit, or another computing device.

Embodiments of the present invention provide a method for calibrating a multi-hole pitot probe wind sensor. The calibration is in situ calibration. The method includes receiving an indication of presence and/or location of a body proximate to the probe. The body may be a human body or other object. The indication may be provided in the form of input parameters provided by a user, via signals from one or more proximity sensors or other sensors (e.g., sensors embedded in or affixed to the human body), or a combination thereof. The method further includes estimating a flow field induced by the presence of the body at least in the vicinity of the probe. The estimate may be made based on an analytical fluid flow model and/or experimental data, for example. The method further includes performing computations related to a superposition of the estimated flow field onto another flow field for the probe itself. The flow field for the probe is descriptive of air flow around the probe in absence of the body. The flow field for the probe may be predetermined based on analytical modelling and/or prior wind tunnel experiments. The method further includes estimating a measurement error induced in the probe by the body, the estimate based on the superposition. The method further includes providing a correction factor for at least partially countering the measurement error.

The calibration may be performed for various positions and/or configurations of the body. For example, when the position and/or shape of the body relative to the sensor is detected using proximity sensors, the calibration may be performed for multiple different sensor readings or ranges of sensor readings.

Embodiments of the present invention provide a method for operating a multi-hole pitot probe wind sensor following calibration as performed above, or in another manner for example via field-based measurements. The method includes receiving an indication of relative location and/or shape of a body proximate to the probe. The method further includes adjusting a correction factor to be applied to the probe measurements based on the received indication. The correction factors may be determined based at least partially on pre-calibration. The indication may be based on output of proximity sensors, or via another means such as user input.

Embodiments of the present invention provide a method for calibrating a multi-hole pitot probe wind sensor. The method includes providing a set of one or more configurations for a body proximate to the probe. The method further includes, for each of the set of configurations, experimentally determining a measurement error induced in the probe by the body and providing a correction factor for at least partially countering the measurement error. In some embodiments, the set of one or more configurations are detected using one or more proximity sensors.

Embodiments of the present invention provide a multi-hole pitot probe wind sensor. The sensor includes at least a first pitot tube, a second pitot tube and a third pitot tube. Each pitot tube has a respective pressure port, and the pressure ports face in different directions. The sensor also includes two differential pressure transducers. The first differential pressure transducer is operatively coupled to the first pitot tube and the second pitot tube for providing a first measurement of differential pressure between the first pitot tube and the second pitot tube. The second differential pressure transducer is operatively coupled to the first pitot tube and the third pitot tube for providing a second measurement of differential pressure between the first pitot tube and the third pitot tube.

Embodiments of the present invention provide for an apparatus which directly measures wind yaw angle effects, Reynolds number effects, road surface condition effects, and inertial effects on aerodynamic performance.

Embodiments of the present invention may be applied for testing rider fluid-dynamic performance using different body positions. Embodiments of the present invention may be applied for obtaining environmental data on a specific race course: including wind, temperature, humidity, elevation. Embodiments of the present invention may be applied for training athletes in optimal drafting techniques. Embodiments of the present invention may be applied for new-athlete-specific assessments of ride difficulty.

System Description

FIG. 1 illustrates a sensing and computing apparatus provided according to an embodiment of the present invention. The apparatus is presented in the context of a bicycle, although it can be readily adapted to other applications. The apparatus includes multiple sensors providing input to a microprocessor 110 operatively coupled to memory 112, and an interface device 115 for presenting information to a user.

In one embodiment, all of the illustrated sensors are included. In other embodiments, one or more of the sensors may be omitted, potentially with a corresponding loss of function. When a sensor is omitted, the data typically provided by the sensor may be estimated, for example as a fixed value or as a function of other sensor inputs according to a predetermined relationship. It will be readily understood which sensors are required for providing a given functionality of the apparatus. In some embodiments, at least some of the sensors are provided within a common housing, along with the microprocessor. The microprocessor can be replaced with other processing circuitry in some embodiments.

At least some of the sensors, along with the processing circuitry, memory and interface device (prior to configuration as described herein), may be provided as off-the-shelf components, which may be particularly configured to operate as described herein. In particular, the pressure transducers may be particularly configured as described herein.

Figure 2:
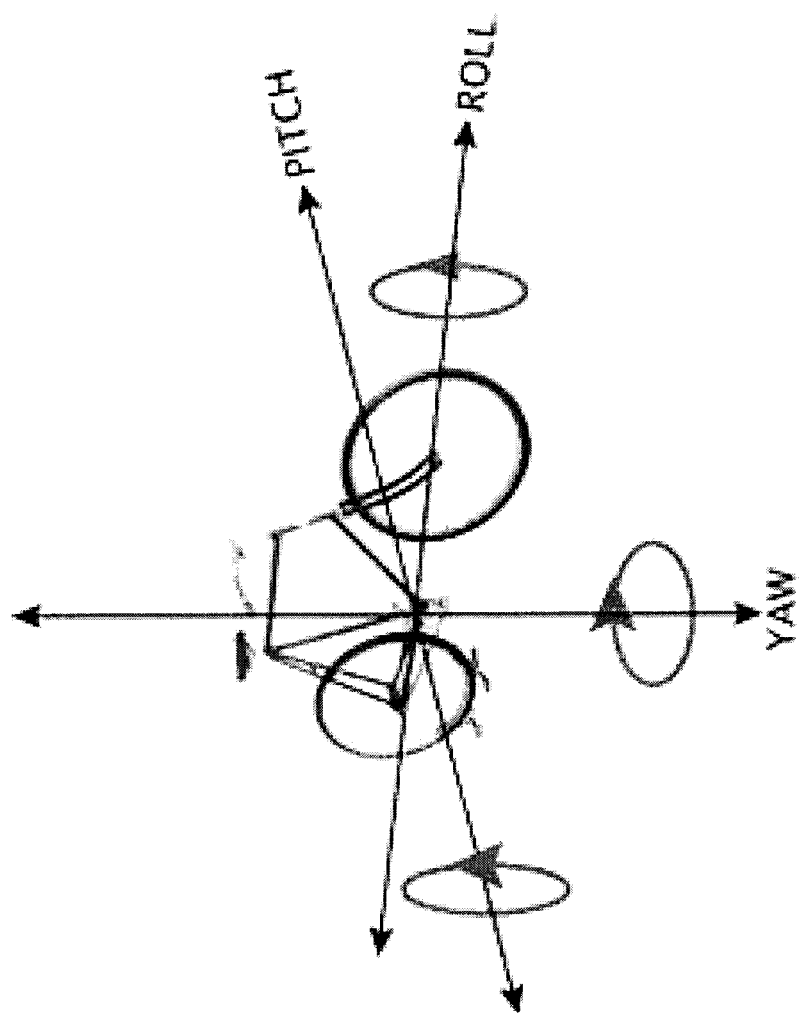
FIG. 2 illustrates yaw, pitch, and roll directions according to an embodiment of the present invention.

The sensors include an accelerometer and/or gyroscope 120 configured to measure forward acceleration, roll angle, handlebar yaw, and/or pitch angle. Pitch angle may correspond to the slope or grade of the road surface. FIG. 2 illustrates definitions of yaw, pitch and roll parameters for a bicycle, by way of example.

The sensors include a relative humidity sensor 125 configured to measure water vapor (or other vapor and/or particle) concentration in air. Air density is significantly impacted by humidity, and air density is a relevant parameter for computing drag forces in air. Therefore, input from the relative humidity sensor may be used to determine air density and adjust drag force values during computation. The processing circuitry may be configured to compute drag force coefficients based at least in part on relative humidity as indicative of air density.

The sensors include a barometric pressure sensor 130. The barometric pressure is used as a reference pressure in wind speed calculations. The barometric pressure may also operate as an altimeter used to compute local elevation. Computing of elevation based on barometric pressure will be readily understood by a worker skilled in the art. The changes in elevation over time may be used to compute road slope and support the measurements from the accelerometer and/or gyroscope 120.

In some embodiments, the reference pressure can be readily obtained using a static pitot tube based pressure sensor affixed to the object or vehicle.

The sensors include a temperature sensor 135. Temperature measurements may be used to facilitate determining air density as a function of local air temperature. Temperature and elevation measurements may be is used in conjunction with the relative humidity sensor 125 to estimate the air density.

The sensors include a vibration sensor 140, for example incorporating a piezoelectric transducer. The vibration sensor measures local vibration of the vehicle or object itself. Input from the vibration sensor may be used, by the processing circuitry, to dynamically estimate rolling friction caused by the vehicle tires according to a predetermined quantitative relationship. Rolling friction measurements may be based in part on additional user-provided information, such as the overall weight of a vehicle plus driver and other load, the tire size and type, and the air pressure in tire. In some embodiments, one or more items of user-provided information may instead be automatically determined based on sensor input, such as strain gauge force sensors for weight and tire pressure sensors.

The sensors include one or more pressure transducers 145, configured to measure the differential pressure between two sources. In some embodiments, two pressure transducers are used to cooperatively measure wind speed and wind yaw angle directly, in the moving frame of reference of the object. Particular configurations of the pressure transducers and associated wind sensor are described below.

The sensors include a direct force power measurement sensor 150, such as a strain gauge operatively coupled to the bicycle pedals, crank, wheel hub, or chain, for measuring power input to the vehicle. The power measurement sensor may measure instantaneous and/or average force applied to drive the vehicle.

In the case of a human-powered vehicle, the sensors may include a cadence sensor 155 for determining pedaling rotational speed. In some embodiments, the cadence sensor may be omitted. In one embodiment, cadence may be estimated from periodic components of signals provided by the direct force power measurement sensor 150. A Fourier transform analysis (e.g. fast Fourier transform) of the power measurements may be used to detect the frequency of periodic components corresponding to the cadence. Ground speed measurements may also be used to assist in determining cadence, for example to discern between the cadence frequency and higher-order harmonic frequencies in the power measurements as expressed in the frequency domain.

The sensors include a speed sensor 160 for measuring speed relative to a given, typically fixed, reference frame (e.g. ground speed). In some embodiments, the speed sensor includes a Global Positioning System (GPS) unit. In other embodiments, the speed sensor includes a wheel revolution sensor (e.g., a rare earth magnet coupled to a hall-effect sensor) which is calibrated with the outer circumference of the wheel. Speed, position and acceleration can be estimated based on one another using numerical differentiation or integration techniques. In one such embodiment, the wheel revolution sensor resolution is improved by affixing multiple rare earth magnets at equally spaced points about the wheel circumference.

The microprocessor 110 operatively coupled to memory 112 (or other processing circuitry) is configured to receive signals from the various sensors, for example via an intermediate analog-to-digital converters, sampling circuitry, data bus and/or similar components where necessary. The microprocessor, by executing program instructions stored in the memory, performs calculations such as those related to drag estimation, and sends data to the interface device 115 for presentation to a user.

The interface device 115 may include radio frequency communication unit such as a Bluetooth™ transceiver configured to wirelessly transmit signals to another device such as a computer, handheld device such as a cell phone, or the like. The interface device 115 may also receive user input for interacting with the apparatus, for example to configure the apparatus, request stored data records, set user preferences, or the like. In some embodiments, the interface device may include a display such as an LCD screen and user inputs such as buttons, a touchscreen, or the like.

The apparatus further includes a power supply such as a lithium ion battery, along with associated power supply electronics, on/off switch, and the like. The apparatus further includes a housing, such as illustrated below.

Figure 3A:
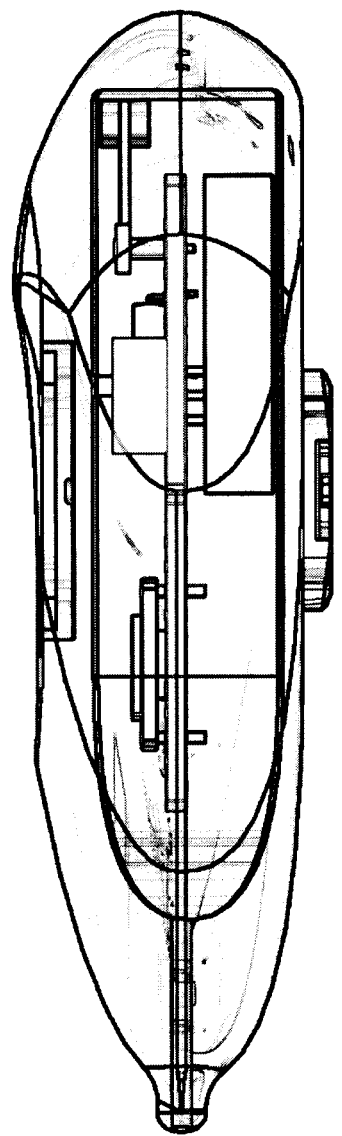
FIGS. 3A to 3F illustrate views of an apparatus provided according to an embodiment of the present invention.
Figure 3B:
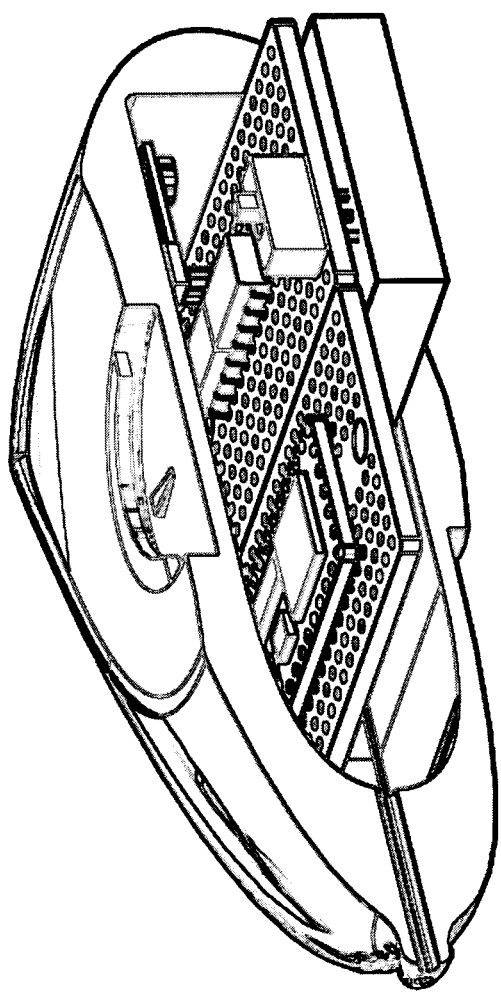
Figure 3C:
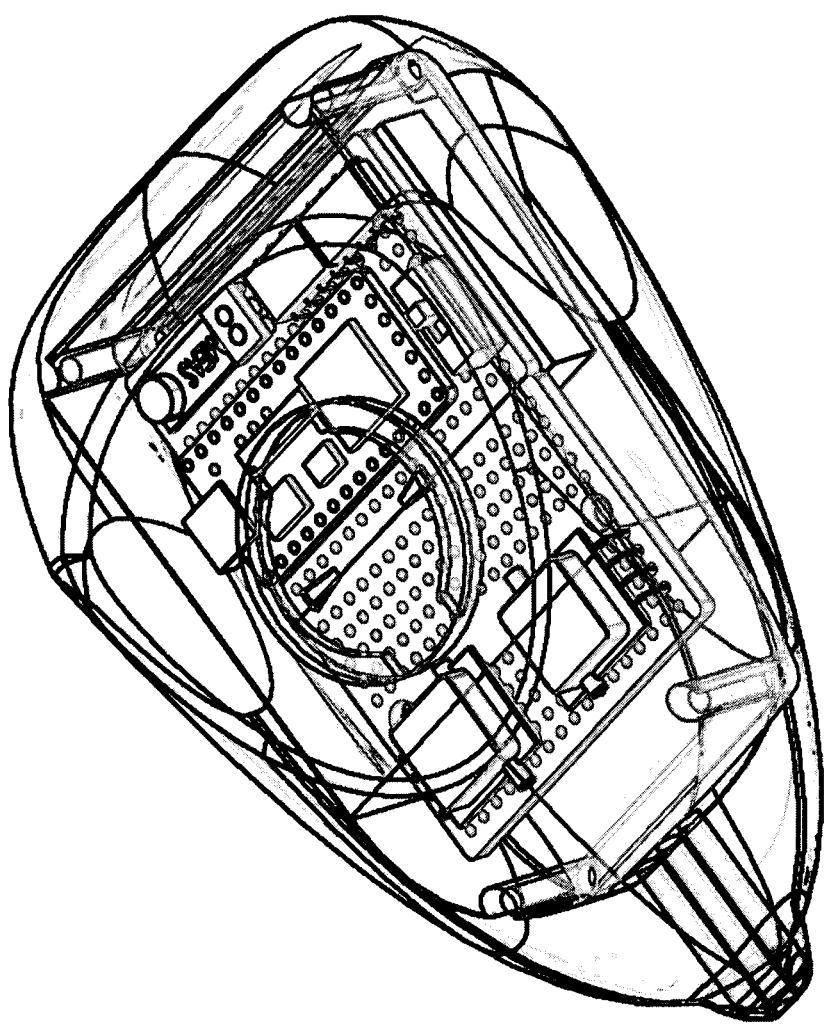
Figure 3D:
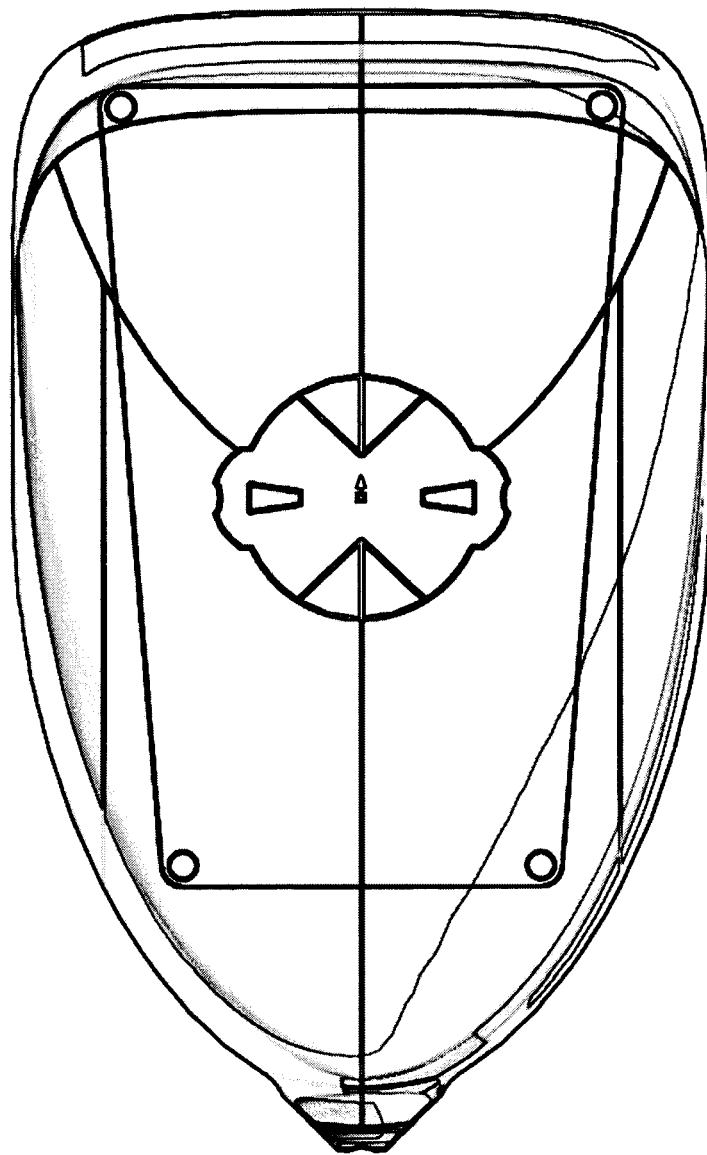
Figure 3E:
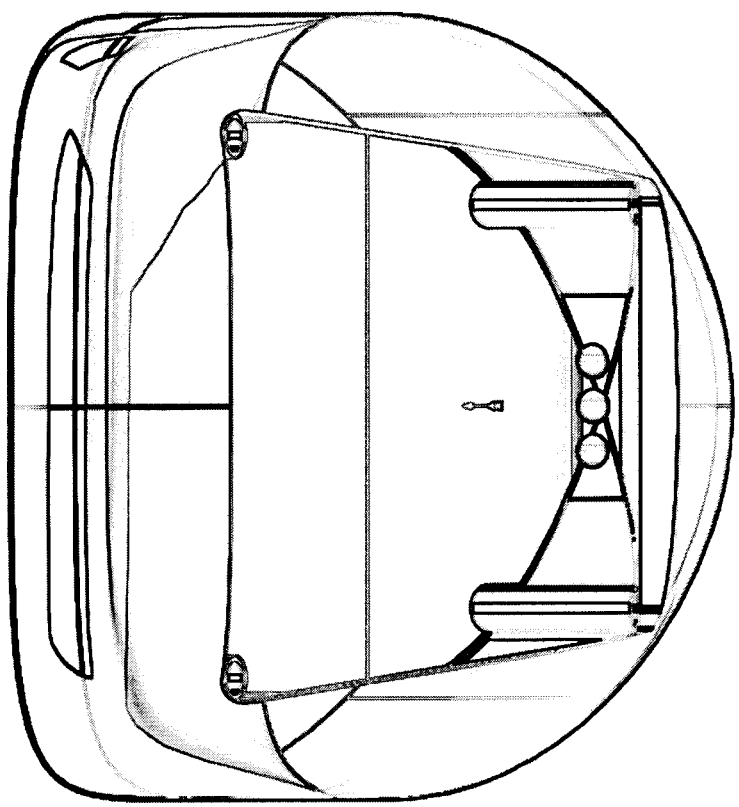

FIGS. 3A to 3F illustrate various views of the apparatus according to an embodiment of the present invention. FIGS. 3A to 3D illustrate transparent views of the apparatus including the housing and enclosed circuitry. FIGS. 3D and 3E illustrate top and front views of the housing, respectively.

Figure 3F:
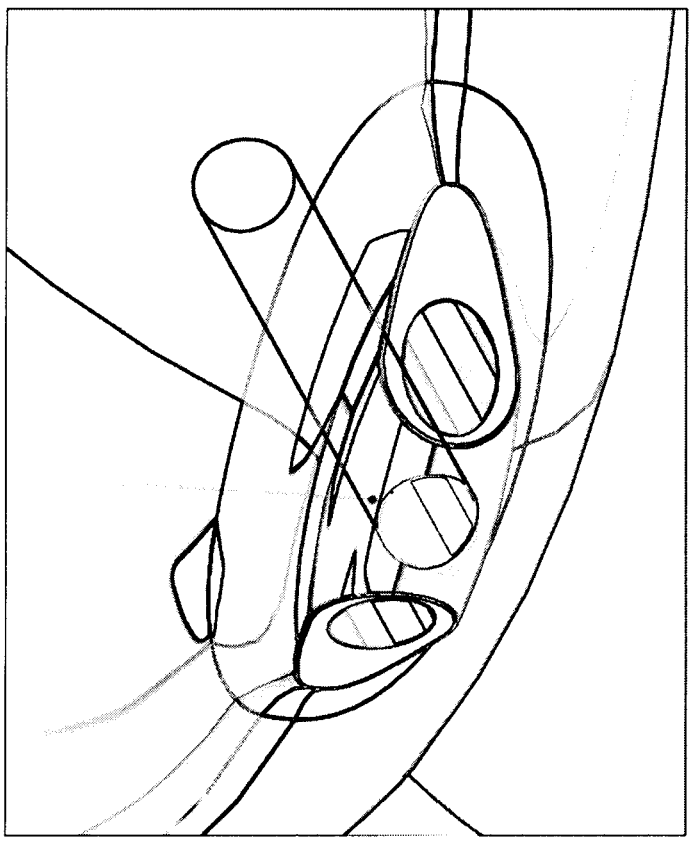

FIG. 3F illustrates a close up view of the front portion of the apparatus, including the 3-hole pitot probe apparatus.

Operation Details

A description of how the sensor data may be used and processed in some embodiments is now provided. In various embodiments, and again in the context of a bicycle or ground vehicle, the apparatus may be used to provide a detailed (and possibly substantially full) characterization of the driver's or rider's state, for example including: road slope, object speed with respect to ground or another fixed reference frame, object acceleration, air density, wind speed, wind direction, wind acceleration, input power, rolling resistance, rolling resistance coefficient ($C_{rr}$), drivetrain and wheel bearing losses, tire pressure, and the history of these state variables in time.

Embodiments of the present invention provide an output variable indicative of rider (or object) coefficient of drag area ($C_DA$) and its variation in time.

Embodiments of the present invention provide an output variable indicative of power being utilized to overcome or undergo one or more of: air drag; drivetrain losses; rolling friction; rider or object acceleration (e.g., effects of changes in stored kinetic energy); rotating spoke drag; rider or object changes in elevation/road slope (e.g., effects of changes in potential energy), and wheel rotational inertia (e.g., effects of changes in stored rotational kinetic energy).

Embodiments of the present invention provide an output variable indicative of wind speed, wind yaw/direction, and wind bursts/gusts (e.g., wind acceleration).

Embodiments of the present invention provide an output variable indicative of metabolic functions, for example used in conjunction with user inputted data based on a fitness test, such as VO2 max, sweat rate, and lactate threshold data. The metabolic functions may include athlete fluid intake requirements, based on a functional relationship with humidity, air temperature, and heart rate. The metabolic functions may include electrolyte intake requirements. The metabolic functions may include caloric intake requirements.

Figure 4:
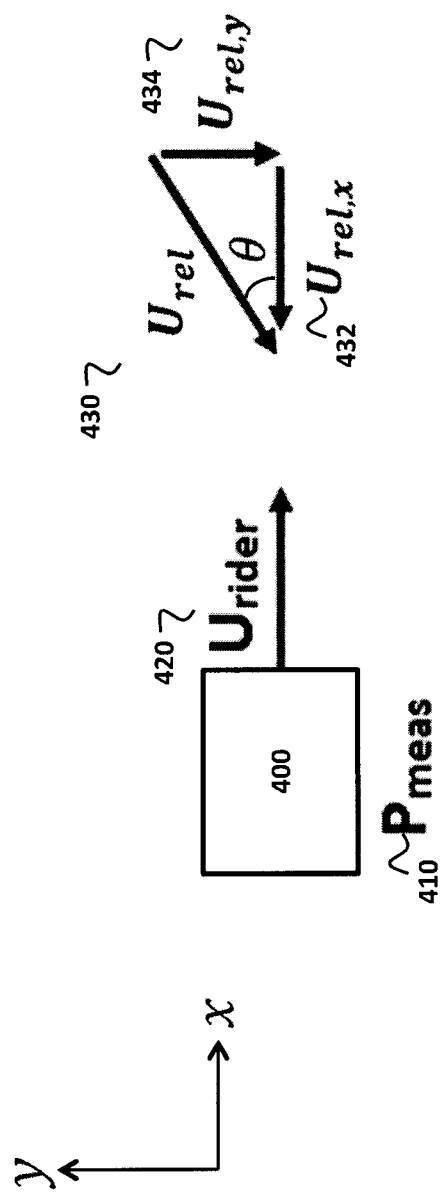
FIG. 4 illustrates a block diagram showing force relationships according to an embodiment of the present invention.

A first drag computation scenario is now presented. FIG. 4 illustrates a block diagram showing an object 400 such as a top view of a vehicle equipped with a power meter which measures input power $P_{meas}$ 410 for driving the vehicle forward variable, a speed sensor measuring ground velocity $U_{rider}$ 420, and an incoming flow speed sensor which measures air resistance $U_{rel}$ 430. The measured air resistance includes magnitude and direction and can be resolved into components $U_{rel,x}$ in the object main direction of motion (x-direction) 432 and $U_{rel,y}$ 434 perpendicular to the object main direction of motion (y-direction). $U_{wind}$ is a vector representation of wind speed (relative to a fixed reference frame), while $U_{rel}$ is a vector representation of the air resistance in the moving reference frame of the object. Thus, $U_{rel}$ can generally be viewed as a vector sum of $-U_{wind} + U_{rider}$.

A first computation operation corresponds to realization of the equation:

$$\vec{U}_0 = (-|\vec{U}_{wind}|\cos\theta + U_{rider})\vec{i} + (-|\vec{U}_{wind}|\sin\theta)\vec{j} \quad (1)$$

where, $$U_{rel,x} = -|\vec{U}_{wind}|\cos\theta + U_{rider}$$

In an idealized case, including moving horizontally (for example on a flat road) at a constant speed with no losses and ignoring wheel rotational kinetic energy, further computation operations may correspond to realization of the equations:

$$F_{drag} = \tfrac{1}{2} C_D A \rho (-|\vec{U}_{wind}|\cos\theta + U_{rider})^2 U_{rider} \quad (2)$$

$$P_{meas} = \tfrac{1}{2} C_D A \rho (-|\vec{U}_{wind}|\cos\theta + U_{rider})^2 U_{rider} \quad (3)$$

Here, $\rho$ is the density of the air, $\vec{U}_{wind}$ is the measured wind speed in the absolute frame of reference (i.e., from a fixed observer), $\vec{U}_{rider}$ is the ground speed of the vehicle, $\theta$ is the wind yaw angle in the absolute frame of reference, $C_DA$ is the coefficient of drag ($C_D$) of the object/vehicle (typically established from wind tunnel testing) multiplied by the frontal area (A) of the object/vehicle measured in the y-z plane, i.e. in the plane perpendicular to forward direction of motion. Frontal area may be estimated for example based on photographs, scaled 3D renderings of the vehicle, or onboard sensors which detect the human body position.

Embodiments of the present invention are configured, via computation based on sensor measurements, to estimate the quantity $C_DA$. This quantity, for an arbitrary object/vehicle of unknown shape and unknown drag coefficient, can be computed directly by re-arranging Equation (3) for power:

$$C_D A = \frac{P_{meas}}{\rho \left(-|\vec{U}_{wind}|\cos\theta + U_{rider}\right)^2 U_{rider}} \quad (4)$$

In the presently described embodiment, $P_{meas}$ is obtained from an on-board power meter, $\rho$ is obtained through an established (generally accepted) mathematical correlation between temperature, elevation, and relative humidity. In particular, the density of pure air is computed from the ideal gas law, $\rho = P/R_a T$, where P is the static (absolute) pressure, T is the absolute temperature, and $R_a$ is a specific gas constant for dry air. The addition of water vapour into the air is accounted for by computing the mixture of two ideal gases with the following equation:

$$\rho_{humid\ air} = \frac{P_a}{R_a T} + \frac{P_v}{R_v T} \quad (5)$$

where $\rho_{humid\ air}$ is the density of the humid air, $P_a$ is the partial pressure of dry air, $R_a$ is the specific gas constant for dry air, $P_v$ is the partial pressure of water vapour, and $R_v$ is the specific gas constant for water vapour. The partial pressure of the dry air can be computed according to:

$$P_a = P - P_v \quad (6)$$

where P is the observed or measured absolute pressure, and $P_v$ is computed using the measured relative humidity as follows:

$$P_v = \gamma \left(0.061078 \times 10^{\frac{7.5T}{T+237.3}}\right) \quad (7)$$

where $\gamma$ is the relative humidity. $\vec{U}_0$, $\vec{U}_{wind}$, as well as $\theta$, are obtained directly from the wind sensor (e.g. 3-hole pitot probe) and from the ground speed obtained via the (ground) speed sensor.

Figure 5:
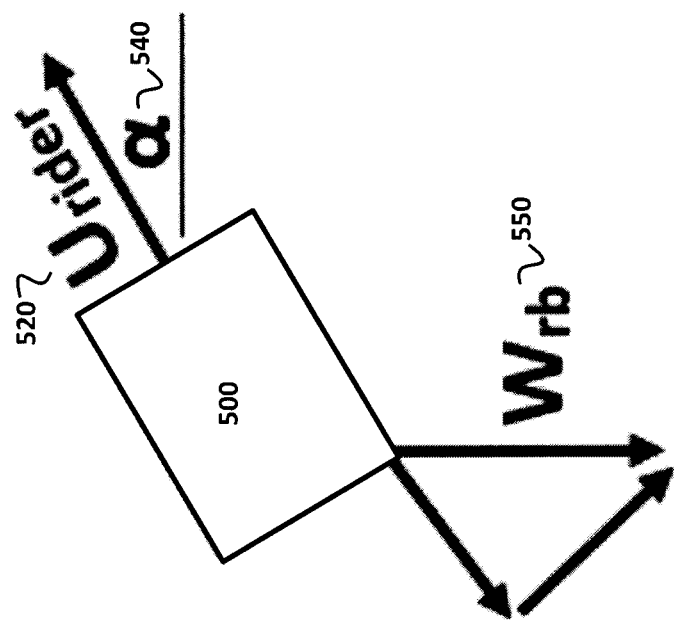
FIG. 5 illustrates a block diagram showing force relationships according to another embodiment of the present invention.

A second drag computation scenario is now presented. This scenario is applicable for a vehicle which is climbing (gaining altitude) and accelerating. FIG. 5 illustrates a block diagram showing an object 500 such as a side view of a vehicle equipped with a power meter which measures input power $P_{meas}$ for driving the vehicle forward variable, a speed sensor measuring ground velocity $U_{rider}$ 520, and an incoming flow speed sensor which measures air resistance $U_{rel}$. The climbing (inclination) angle α 540 is also shown.

For the sake of clarity, it is assumed that the weight of the vehicle plus its driver/rider is included or added to calibration data, $W_{rb}$ 550. The rider or object is equipped with a gyroscope device to measure the (e.g. instantaneous) inclination angle α, as well as an accelerometer device to measure (e.g. forward) acceleration. Inclination angle can correspond to the angle, relative to the direction of gravity, of the ground surface at the location of the vehicle. The sum of forces acting on the rider becomes more complex than in the first scenario, with the addition of gravitational force as well as relative acceleration.

Neglecting frictional losses, the acting forces can be expressed as:

$$\Sigma F_x = F_{drag} + w_{rb} \sin \alpha = m_{rb} a_{rel} \quad (8)$$

where $m_{rb}$ is the mass of the object (e.g. bike+rider), computed as $m_{rb} = W_{rb}/g$, where g is the local acceleration due to gravity, and $a_{rel}$ is the resultant acceleration of the rider in the x-direction, measured directly using an accelerometer and/or other suitable sensor (e.g., through numerical differentiation of velocity measurements).

Rearranging the above for $C_DA$ yields:

$$C_D A = \frac{P_{meas} - W_{rb}\sin\alpha\left(-\left|\vec{U}_{wind}\right|\cos\theta + U_{rider}\right) + m_{rb}a_{rel}\left(-\left|\vec{U}_{wind}\right|\cos\theta + U_{rider}\right)}{\rho\left(-\left|\vec{U}_{wind}\right|\cos\theta + U_{rider}\right)^2 U_{rider}} \quad (9)$$

In this second scenario, $P_{meas}$ may be obtained from an on-board power meter, ρ may be obtained through an established (generally accepted) mathematical correlation between temperature, elevation, and relative humidity and $\vec{U}_0$, $\vec{U}_{wind}$, as well as θ, may be obtained directly from the wind sensor (e.g. 3-hole pitot probe) and the ground speed obtained via the (ground) speed sensor.

In various embodiments, frictional losses may be incorporated into the computations. The second scenario above illustrates the basic functionality according to an embodiment of the present invention. Additional sensors may be provided and utilized in order to compensate for frictional losses associated to the vehicle drivetrain as well as rolling friction. For both of these types of losses, the empirical model employed by Martin et al. (1998)—"Validation of a mathematical model for road cycling power" J. App. Bio-Mech, Vol. 14(3) and Martin et al. (2006b)—"Aerodynamic drag area of cyclists with field-based measures", Sportscience 10: 68-9 may be used, both of which are hereby incorporated by reference. What is used in these models is the coefficient of rolling resistance, which may be determined for example via a calibration procedure, as well as the current cadence, which may be obtained via an onboard cadence sensor. Alternative mathematical or empirical models of frictional losses may also be incorporated depending on the location whereby the power measurement is being completed (e.g., a power sensor located on a crankshaft would contain different losses than a power sensor located in a wheel hub).

In contrast to other methods, such as work by Snyder & Schmidt —"Determination of Drag Parameters Utilizing a Bicycle Power Meter," Human Powered eJournal, Article 05, issue 01, (Oct. 21, 2004) and available at http://www.hupi.org/HPeJ/0005/0005.htm and hereby incorporated by reference, embodiments of the present invention do not necessarily require controlled conditions, such as the imposition of zero acceleration effects, and zero wind effect, for an adequate aerodynamic analysis.

Computations for evaluating one or more of the above equations may be performed by the processing circuitry (e.g. microprocessor operatively coupled to memory). For example, computations for evaluating Equations (4) or (9), or similar equations can be performed. In some embodiments, computations are performed by the microprocessor using standard floating-point methods. In some embodiments, the computations are approximated using a lookup table method, in which the solutions to one or more equations are pre-computed for various combinations of input variables and stored in memory. Sensor input (potentially along with calibration data indicating values for input variables or parameters which are not sensed) is used as input to a lookup operation to retrieve a stored solution which is appropriate for the present set of input values, including sensor input. In some embodiments, when a stored solution is not available for a given set of input values, interpolation or extrapolation may be performed in order to obtain an approximate solution. In some embodiment, digital or analog processing circuitry can be configured to automatically receive and process input signals from sensors to provide output signals which are based on the input signals in a predetermined manner which implements the computations described above.

Sensor Detail: Wind Sensor

Embodiments of the present invention provide an air flow speed and direction sensor, also referred to as a wind sensor. The term "wind" may refer to the motion of any fluid relative to a moving object, which may be due to one or both of the object's motion and the fluid motion.

For an object inserted into a flowing fluid, such as air, the pressure distribution over the surface of the body varies from a maximum (stagnation pressure) to minimum values which can be lower than the static pressure of the fluid (absolute pressure). The stagnation pressure is calculated as the sum of the static and dynamic pressures:

$$P_{stag} = P_\infty + \rho U_o^2 \quad (10)$$

The main purpose of a multi-hole pitot probe is to measure the local pressure at different points on the curved surface of an object in order to discern the direction and magnitude of the incoming flow speed. Multi-hole probes can be calibrated analytically or experimentally, though the latter is more often employed.

Figure 6:
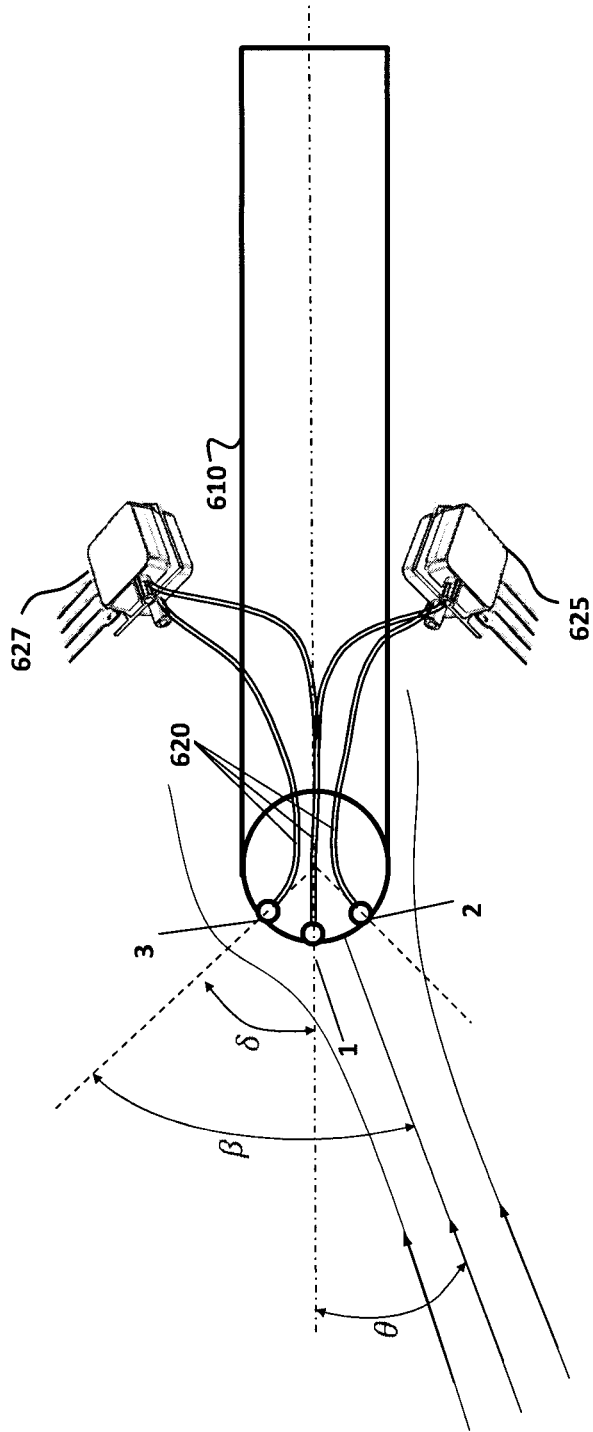
FIG. 6 illustrates an apparatus comprising pressure transducers used as a wind speed and yaw angle sensor, according to an embodiment of the present invention.

FIG. 6 illustrates an apparatus comprising pressure transducers 625, 627 used as a wind speed and yaw angle sensor, according to an embodiment of the present invention.

A housing 610 is provided having at least three forward-facing pitot tubes 620 which are each open at one end. The openings correspond to pressure ports 1, 2, 3. The pressure transducers 625, 627 are coupled at interior locations of the pitot tubes 620 for measuring stagnation pressure. The direction of the incoming flow is identified in FIG. 6 using streamlines and arrows. As illustrated, a first pressure transducer 625 is coupled to both a first pitot tube connected to a central one of the pressure ports 1, and a second pitot tube connected to a pressure port 2 located on one side of the central pressure port 1. A second pressure transducer 627 is coupled to both the first pitot tube connected to the central one of the pressure ports 1, and a third pitot tube connected to a pressure port 3 located on another side of the central pressure port 1. The pitot tube connecting the central pressure port 1 to the two pressure transducers is a split pitot tube, that is having a "Y" shape and three endpoints.

Analytical Solution:

Assuming the flow development around the probe is approximated as the potential flow around a cylinder with circular cross section, an analytical potential flow solution can be used to quantify the velocity on the cylinder as:

$$V(\theta)=2V \sin \beta \tag{11}$$

where θ is the angular distance from the point of stagnation to the point of interest (FIG. 6). Bernoulli's equation can then be employed to calculate the pressure at the three pressure taps as shown below:

$$P_\infty+\tfrac{1}{2}\rho U_o^2=P(\delta-\theta)+2\rho U_o^2 \sin^2(\delta-\theta) \tag{12}$$

$$P_\infty+\tfrac{1}{2}\rho U_o^2=P(\theta)+2\rho U_o^2 \sin^2(\theta) \tag{13}$$

$$P_\infty+\tfrac{1}{2}\rho U_o^2=P(\delta-\theta)+2\rho U_o^2 \sin^2(\delta+\theta) \tag{14}$$

The three equations (12) to (14) can be utilized as follows: if the pressure at ports 1, 2, and 3 are measured, then the system of equations (12) to (14) can be solved for the unknowns $P_\infty$, $U_o$, θ, wherein $P_\infty$ represents the local value of the static pressure, $U_o$ represents the local speed of the incoming flow relative to the probe, and θ represents the yaw angle of the flow relative to the probe.

However, the location of the pressure taps are subject to manufacturing constraints, which introduces measurement errors. In particular, manufacturing tolerances for both the pressure tap hole size and hole position will result in variances in the resulting pressure measurements, introducing measurement (bias) errors. The measurement errors can be corrected for through experimental calibration, for example as discussed below.

Experimental Calibration:

Experimental calibration can be completed by inserting the probe into a known flow field (e.g., a wind tunnel facility), traversing various yaw angles, and measuring the corresponding pressures. This type of experimental calibration is optional according to embodiments of the present invention. The formulas and discussion here pertain to three-hole probes, but extensions to any number of holes is straightforward and can be found in the literature (e.g., Johansen, E. S., Rediniotis, O. K., Jones, G., "The compressible calibration of miniature multi-hole probes", Journal of Fluids Engineering 123, pp. 128-138, 2001). The calibration can be done by the 'Streamline Projection Method', which is based on the assumption that the free stream velocity is projected on each one of the three sensing holes (pressure ports) 1, 2, 3. Therefore, the velocity normal to the probe surface results in a dynamic pressure, which is added to the free stream static pressure. Thus, the holes of the probe are assumed to measure a total pressure which is equal to the static pressure plus the fraction of the dynamic pressure based on the velocity projection normal to each of the holes. This can be expressed via the equation:

$$P_i=P_\infty+\tfrac{1}{2}\rho w_i^2 \tag{15}$$

where i=1, 2, 3, corresponds to holes/ports 1, 2, 3, as in FIG. 6, and $w_i$ is the velocity projection normal to the $i^{th}$ hole.

The first step is to obtain the three flow velocity components normal to the hole surfaces, expressed as:

$$w_1=U_o \cos \theta \tag{16}$$

$$w_2=U_o \cos(\beta+\theta) \tag{17}$$

$$w_3=U_o \cos(\beta-\theta) \tag{18}$$

The three holes thus sense the following pressures:

$$P_1=P_\infty+\tfrac{1}{2}\rho(U_o \cos \theta)^2 \tag{19}$$

$$P_2=P_\infty+\tfrac{1}{2}\rho(U_o \cos(\beta+\theta))^2 \tag{20}$$

$$P_3=P_\infty+\tfrac{1}{2}\rho(U_o \cos(\beta-\theta))^2 \tag{21}$$

Next, coefficients are defined pertaining to the experimental calibration:

An average pressure coefficient is defined as:

$$\overline{P}=\frac{P_2+P_3}{2} \tag{22}$$

A directional coefficient is defined as:

$$k_\theta=\frac{P_3-P_2}{P_1-\overline{P}}=\frac{k_3-k_2}{k_1-\overline{k}} \tag{23}$$

The wind yaw angle is estimated directly from the directional coefficient via the equation below:

$$\theta=\sin^{-1}\left(\frac{k_\theta}{6}\right)\times\frac{180}{\pi} \tag{24}$$

The incoming wind speed is estimated directly from the average pressure as well as an experimentally determined calibration coefficient with the equations below:

$$C=\frac{U_{o,calibration}}{\sqrt{\frac{2(P_1-\overline{P})}{\rho}}} \tag{25}$$

$$U_o=C\times\sqrt{\frac{2(P_1-\overline{P})}{\rho}} \tag{26}$$

In Equation (25) above, $U_{o,calibration}$ is the primary parameter being controlled in the wind tunnel (i.e., the free stream of the wind tunnel is set), and the corresponding coefficient C is obtained as an ensemble average of several tests over a wide range of flow speeds and wind yaw angles. This coefficient (C) is stored in memory for application in a real environment.

The use of a three-hold probe for estimation of the free stream velocity and wind yaw angle is acceptable for yaw angles less than about 15°. (For larger wind yaw angles, such as yaw angles up to about 30°, a five-hole probe may be selected.) Specific calibration experiments were performed using a prototype device in a wind tunnel. The experiments revealed that the above method resulted in estimates of free stream velocity and yaw angle which were within 2% of their true values, with 95% confidence.

Dynamic Calibration in a Real Environment:

The above-mentioned experimental calibration is typically performed in a wind tunnel facility where no physical obstructions are altering the flow path or pressure field around the probe (aside from the probe itself). It can be expected that in a given engineering application, the pitot probe calibration would need to be corrected to account for nearby wall or interference effects. In the case of a pitot probe mounted to a bicycle, the rider and bicycle are anticipated to affect the surrounding pressure field, including regions upstream of the probe itself. Hence, the following procedure is outlined whereby the calibration data for the pitot probe is dynamically generated and/or altered based on the position of the rider and bicycle relative to the position of the probe (as discussed above the rider and bicycle may be replaced with any vehicle or object to which the probe is mounted). Generally, the calibration procedure may be carried out based on the presence of an object which is partially or fully downstream of the probe (i.e. on the lee side with respect to air motion relative to the object) but which nevertheless affects air flow as measured by the probe. If the object is partially upstream of the probe, it should be in a location which is not directly in front of the probe and/or which does not cause the object to interfere with the fluid approaching the probe.

The dynamic in situ calibration is performed following attachment of the sensor to an object. In some embodiments, the sensor is pre-calibrated under controlled conditions such as in a wind tunnel, and then re-calibrated following mounting to the object. The re-calibration may completely overwrite the pre-calibration in some embodiments. In some embodiments, the pre-calibration step is omitted.

Figure 7:
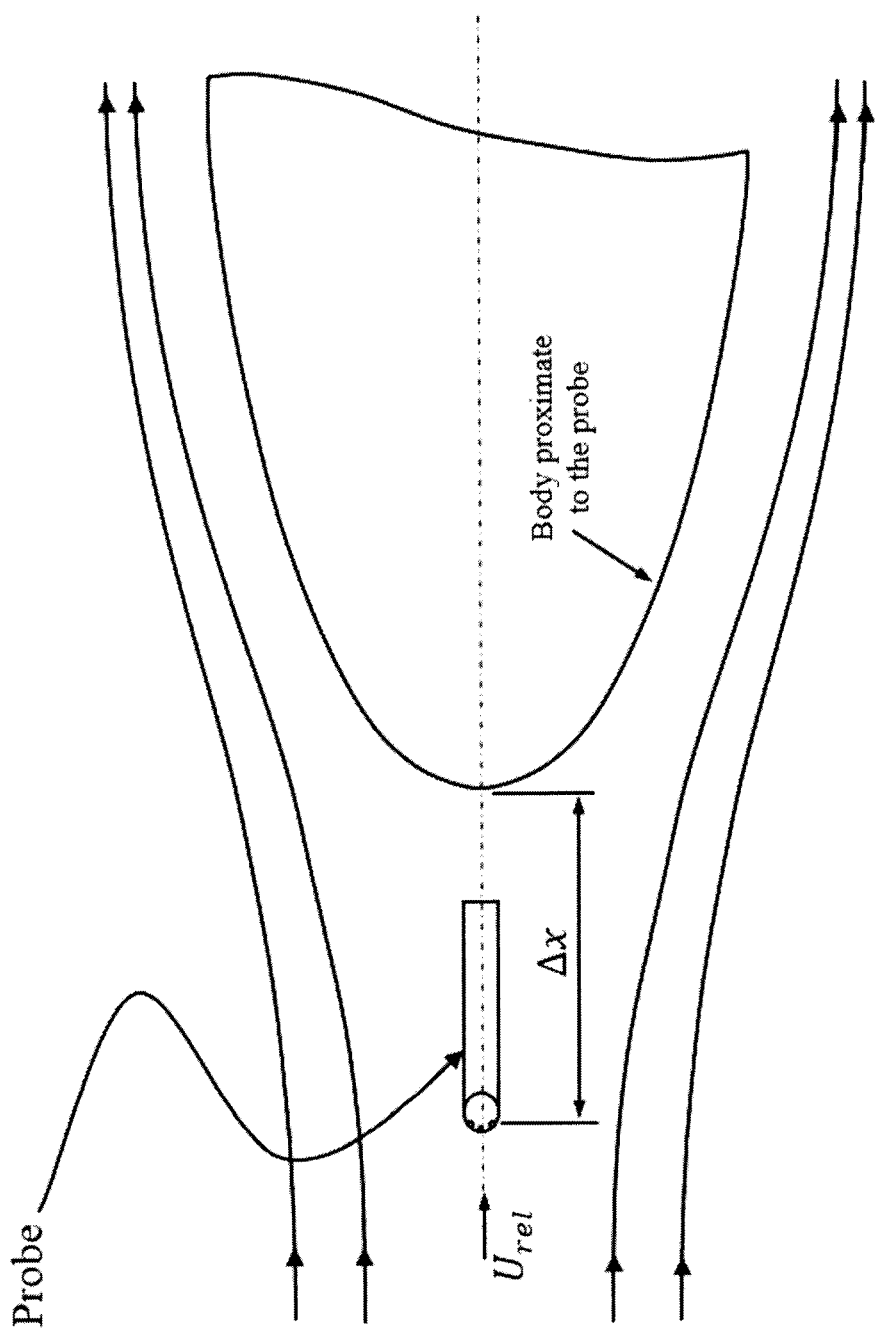
FIG. 7 illustrates operation of a wind speed and yaw angle sensor according to an embodiment of the present invention.

Because the fundamental equations derived for estimating the flow velocity and wind yaw angle follow the assumption of a potential flow field, the same assumption is applied for the bike and rider. This enables the principle of superposition to be applied. Specifically, the flow field solution for the probe itself can be superimposed on the flow field solution for the bike plus the rider in order to adjust the calibration. The level of sophistication in the potential flow model may vary depending on the number of sensors employed. For the purposes of clarity and illustration, in the present example, a single infrared proximity sensor is used to measure the position of the rider relative to the probe itself (or it is information inputted by the user), and the probe is installed in a known location relative to the bicycle ($\Delta x$). In this example, the bike plus the rider is approximated as a rankine half-body whose forward stagnation point is positioned based on user input or the infrared sensor measurement, as shown in FIG. 7. In some embodiments, the body (e.g. the bike plus rider) may be approximated using a different shape or model, other than the rankine half-body. The shape or model to be used may be based on theoretical reasoning and/or experimental testing, for example.

As shown in FIG. 7, the position of the probe relative to the rankine half-body is given by a streamwise distance $\Delta x$, wherein the airflow direction is aligned with the symmetry plane of the rankine body, facilitating the computation of the pressure field and velocity field induced by the presence of the body.

The basic governing equation of the streamfunction (based on the coordinate axis provided in the FIG. 7) is given by:

$$\Psi = U_\infty y + m\tan^{-1}\left(\frac{y}{x}\right) \quad (27)$$

$$m = \frac{y_v U_o}{\pi} \quad (28)$$

where $y_v$ is the half-width of the vehicle (e.g., half-width of the rider). The velocity of the flow at any position in front of the vehicle will be less than that of the free stream velocity, $U_\infty$, as given by the following equations:

$$u = \frac{\partial \Psi}{\partial y}; v = \frac{\partial \Psi}{\partial x} \quad (29)$$

$$U(x, y) = \sqrt{u^2 + v^2} \quad (30)$$

In polar coordinates the equations are more amendable to analytical solution, yielding:

$$V_r = U_o \cos\phi + \frac{m}{r} = -U_o + \frac{m}{\Delta x + a} = -U_o + \frac{y_v U_o}{(\pi \Delta x + y_v)} \quad (31)$$

$$V_\phi \sim 0 \quad (32)$$

Superimposing the solution to the rankine body with the three-hole probe, the free stream velocity magnitude is expected, as seen by the pitot tube, to decrease by approximately:

$$\Delta U = \frac{y_v U_o}{(\pi \Delta x + y_v)} \quad (33)$$

That is, $\Delta U$ represents the difference between the true value of $U_o$ and the measurement $V_r$. This quantity can be used in measurement correction.

In this formulation, no correction is applied for the change in wind velocity in the tangential direction, as it is assumed the pitot probe is mounted symmetrically relative to the downstream body (bike+rider). As an example, when travelling at $$U_o = 10 \left[\frac{m}{s}\right] = 36 \left[\frac{km}{h}\right],$$

with zero wind yaw, and assuming a pitot probe position of $\Delta x=0.5$ [m], and for a rider with $y_v=0.2$ [m], the locally measured air speed will be altered by approximately:

$$\Delta U = \frac{y_v U_o}{(\pi \Delta x + y_v)} = \frac{(0.2)(10)}{(0.5\pi + 0.2)} = 1.12 \left[\frac{m}{s}\right] \quad (34)$$

As shown in Equations (33) and (34), the presence of a body behind a pitot probe (e.g., a rankine half-body) impacts the performance of the probe by introducing errors on the order of 10% of the free stream velocity. The dynamic calibration involves correcting the magnitude of the velocity as measured by the pitot tube using the above equation, with direct input from an infrared proximity sensor providing sensor value $\Delta x$. In this configuration, the measured local yaw angle of the wind is assumed to be unaffected within the designed measurement range of the 3 hole probe, i.e., $-15° \leq \theta \leq 15°$ (though it is contemplated that an alternative approach is to compute a streamfunction for another known yaw angle and include its effects). For higher angles of attack, a more sophisticated streamfunction can be developed for the downstream body (e.g., bike plus rider).

The implementation of a dynamically changing streamfunction for calibration adjustments to the upstream pitot tube is applicable for a variety of dynamic environments in which the shape of the downstream body is deformable (e.g., physically movable like a human on a bicycle), or the shape of the body is a function of yaw angle.

Experimentally Determined Dynamic Calibration from Field Based Measures:

An alternative calibration adjustment to the pitot probe can be completed via field based measures (or wind-tunnel based measures) of the downstream body by following the protocol described next.

First, the device prompts the user for a calibration of the pitot tube once activated and all sensors are communicating.

Next, the device prompts the user for the number N of physical configurations of the body to be calibrated.

Next, for each physical configuration, indexed by i=1:N, the device prompts the user to bring the device up to cruising speed in physical configuration i under a condition of zero external wind (i.e. substantially no air motion relative to ground). The device then prompts the user to stop calibration i.

In more detail, upon receipt of the number N, the device stores into memory the number of physical configurations for the body (bike+rider), and enters a loop to obtain calibration coefficients for each of the aforementioned positions.

Following the prompt to bring the device to cruising speed for a given configuration i, the device will measure and store infrared sensor data (or other data indicative of body position in proximity to the probe) for physical configuration i, while simultaneously storing pressure data and ground speed data. The average infrared sensor reading and standard deviation of that reading will be used to create a calibration range for configuration i. The pressure data will be corrected for the ground speed by generating a stream-function which facilitates the correction in the measured velocity, as given in Equation (33) above, for example.

Following a prompt to stop a given calibration, the calibration data is stored into memory, and the process is repeated for all physical configurations.

This procedure enables the calibration for the pitot tube sensor to be dynamically changing depending on the infrared sensor reading. The infrared sensor reading can be readily replaced by a number of sensors which establish distinct physical configurations of the downstream body. Additionally, the infrared sensor can be replaced by dynamic user or machine input to indicate a change in physical configuration.

In various embodiments, the above calibration protocols can be used to yield a set of N wind sensor correction factors (or other calibration parameters) associated with N physical object configurations (e.g. rider positions). The N object configurations are also associated with N different proximity sensor reading ranges. Subsequently, during operation, output of the proximity sensor is used to select which wind sensor correction factor is to be applied. Specifically, when the proximity sensor readings fall within a range which is associated with one of the N object configurations, the corresponding wind sensor correction factor is retrieved from memory and applied.

Configuration of 3-Hole Probe Pressure Transducers:

When a 3-hole probe is utilized, the expectation is that three distinct pressure measurements are used in order to obtain estimates of the wind speed and wind yaw angle based on the equations (22)-(26) outlined in the above sections.

These equations are repeated here for clarity for the experimental calibration:

Average Pressure:

$$\overline{P} = \frac{P_2 + P_3}{2} \quad (22)$$

Directional Coefficient:

$$k_\theta = \frac{P_3 - P_2}{P_1 - \overline{P}} = \frac{k_3 - k_2}{k_1 - \overline{k}} \quad (23)$$

The wind yaw angle is estimated directly from the directional coefficient:

$$\theta = \sin^{-1}\left(\frac{k_\theta}{6}\right) \times \frac{180}{\pi} \quad (24)$$

The incoming wind speed is estimated directly from the average pressure as well as an experimentally determined calibration coefficient:

$$C = \frac{U_{o,calibration}}{\sqrt{\frac{2(P_1 - \overline{P})}{\rho}}} \quad (25)$$

$$U_o = C \times \sqrt{\frac{2(P_1 - \overline{P})}{\rho}} \quad (26)$$

As shown in the above equations, relevant quantities usable for estimating wind yaw and wind speed are $(P_3-P_2)$, and $(P_1-\overline{P})$. Using a differential pressure transducer on the 3-hole probe, it is possible to measure the difference between $P_3$ and $P_1$. A second probe can be used to measure the difference between $P_2$ and $P_1$:

$$\Delta P_{13} = P_1 - P_3 \quad (35)$$

$$\Delta P_{12} = P_1 - P_2 \quad (36)$$

The above measurement can be summed or subtracted to provide important pressure quantities for flow speed and airflow yaw angle calculation:

$$\Delta P_{12} - \Delta P_{13} = (P_3 - P_2) \quad (37)$$

$$\tfrac{1}{2}(\Delta P_{12} + \Delta P_{13}) = P_1 - \tfrac{1}{2}(P_2 + P_3) = (P_1 - \overline{P}) \quad (38)$$

Embodiments of the present invention therefore provide a pitot-probe wind sensor having two differential pressure transducers configured as described above. For alternative configurations, individual pressures are measured relative to the absolute or static pressure.

The above configuration of two differential pressure transducers allows for adequate sensor functionality with a reduced number of components, for example with two rather than three pressure transducers employed. The two pressure transducers are differential pressure transducers. A first one of the two differential pressure transducers is coupled to first and second pitot tubes for measuring differential pressure. A second one of the two differential pressure transducers is coupled to the first pitot tube and a third pitot tube for measuring differential pressure. In various embodiments, the first pitot tube has a pressure port opening located between port openings of the second and third pitot tubes. That is, the first pitot tube is a central, forward facing pitot tube whereas portions of the second and third pitot tubes face diagonally forward and outward at opposite sides of the first pitot tube. The first pitot tube may include a fork or "Y" junction for coupling the pressure port thereof to both pressure transducers. A computing component, such as processing circuitry (e.g. a microprocessor), is operatively coupled (potentially via an analog-to-digital converter and other intermediate components) to the first and second pressure transducers for obtaining readings therefrom. The computing component provides further data based on the measurements from the transducers, for example as set forth in Equations (37) and (38).

In various embodiments the pitot tubes are curved such that portions of the tubes proximate to the pressure ports face outward in three different directions, for example forward and diagonally forward directions, and ends of the tubes proximate to the pressure sensors are located relatively so as to allow differential pressure readings to be obtained between pairs of tubes.

Sensor Detail: Road Surface Sensor

Embodiments of the present invention provide for a road surface sensor which is configured, based on measured vibrations, to determine a type of surface being traversed by a vehicle such as a bicycle, and/or a coefficient of rolling resistance which varies based on the type of surface. The surface may be, for example, smooth asphalt, rough asphalt, gravel, dirt, or another type of surface. Vibrations may be measured using a piezoelectric transducer, for example.

As outlined by Martin et al. (1998)—"Validation of a mathematical model for road cycling power" J. App. Bio-Mech, Vol. 14(3) (hereinafter Martin (1998)), the force on a wheeled object due to rolling resistance is related to the weight of the object (e.g. the weight of a bike and rider), the tire pressure, tire material, wheel type (casing), and gradient and texture of the riding surface. All of these effects are grouped together in what is commonly referred to as a coefficient of rolling resistance, or $C_{RR}$. The force due to rolling resistance ($F_{RR}$) is given by Martin (1998) as:

$$F_{RR} = C_{RR} W_{rb} \cos \alpha \quad (39)$$

Note that the weight $W_{rb}$ of the object (e.g. bike+rider) is user-inputted, while the road slope is measured experimentally, giving angle $\alpha$ in Equation (39). The aspects of the rolling resistance force to be accounted for are the effects of tire pressure, tire type, and texture of the riding surface, all of which will impact the coefficient of rolling resistance.

In "The mechanics and aerodynamics of cycling," Kyle, C. R., E. R. Burke (Ed.), Medical and Scientific Aspects of Cycling, pp. 235-251, Champaign, Ill.: Human Kinetics, (1988), $C_{RR}$ values ranging from 0.0027 to 0.0040 for clincher bicycle tires are reported. These rolling resistance values were determined using controlled experimental testing on smooth asphalt (Kyle, 1988). In embodiments of the present invention, a baseline coefficient of rolling resistance is determined experimentally. A basic model is provided which incorporates the combined effect of tire pressure and road surface condition.

For determining a baseline coefficient of rolling resistance experimentally, a coast-down procedure is employed. The general coastdown testing procedure outlined by "Road Load Measurement and Dynamometer Simulation Using Coastdown Techniques," J1263, Society of Automotive Engineers (SAE), 1996, is employed with minor modifications that are pertinent only to the specific engineering application (e.g., bicycles versus automobiles). In the present invention, the coast-down procedure is electronically controlled, whereby a user follows step-by-step instructions and performs a coast-down maneuver. Sensor data acquired during the test is utilized to obtain a measure of the coefficient of rolling resistance, $C_{RR}$, under the controlled conditions of the test.

In embodiments of the present invention, an additional sensor is utilized to record vibration measurements during the coast-down procedure. The mean amplitude of the vibration measurements as well as the variance in the amplitude of the vibration measurements provides a calibration starting point. In particular, the coefficient of rolling resistance is assumed to remain constant on a short time interval, if, in that short time interval, the mean amplitude of the vibration measurement is within one standard deviation of variance computed in the calibration. If the mean amplitude of the vibration measurement falls outside of one standard deviation of the variance computed in the calibration, then the coefficient of rolling resistance is adjusted using the following formula (derived empirically through field testing):

$$C_{RR} = C_{RR,calibration}\left(1 + C\left[\frac{\bar{a}_{calibration} - \bar{a}_{meas}}{\bar{a}_{calibration}}\right]\right) \quad (40)$$

In Equation (40), $\bar{a}$ is the normalized short time average peak-to-peak amplitude of vibrations, and C is a constant value determined by causing the processing circuitry to perform a continuous linear regression fit of the vehicle power to overcome drag relative to the power to overcome rolling resistance. It is the y-intercept of this linear fit which determines directly an estimate of the coefficient of rolling resistance and hence, enables computation of parameter C. This procedure can be superseded by a basic linear equation if multiple coast-down tests are performed under different road surface conditions and tire pressures. It is noted that empirical real-time computation of coefficient of rolling resistance and the constant C may be data which are stored in memory for future use under similar conditions.

Additional Drag Component

In some embodiments of the present invention, an additional drag component acting on a moving body can be accounted for, particularly when there is an acceleration of fluid around the moving body or vice versa. This additional drag component may be particularly applied when the body and/or fluid is aggressively accelerating. Additionally or alternatively, the additional drag component may be applied more frequently in a water based (highly viscous) fluid environment.

Naturally, when a body is accelerating in a fluid, there is what is known as an "inertial effect" on the drag due to the mass of the body and its acceleration. But, in addition to this inertial force, there is also a drag component that arises from the fact that work is being done on the fluid in order to accelerate it around the body. This additional energy requirement is known as the "added mass effect". In fluid mechanics, added mass or virtual mass has been described in various references, for example in Newman, John Nicholas (1977), "Marine hydrodynamics," Cambridge, Mass.: MIT Press. § 4.13, p. 139. ISBN 0-262-14026-8, and https://en.wikipedia.org/wiki/Added_mass.

According to embodiments of the present invention, some equations regarding added mass are incorporated to improve the accuracy of measurements under cases of large accelerations or decelerations. In one embodiment, an apparatus may be configured to measure wind speed and ground speed simultaneously, and gradient estimations may be used to determine the acceleration of the fluid around the body. This may in turn be used to estimate the "added mass" force. In nearly all cases in air this force is quite small and may be considered negligible for many applications. But, for hydrodynamics applications, the added mass effect becomes important. The effect may also be important in certain very high precision aerodynamic applications.

Added mass and history force equations are obtained by adapting the approach of Odar, F., & Hamilton, W. S. (1964), "Forces on a sphere accelerating in a viscous fluid," Journal of Fluid Mechanics, 18(02), 302-314:

$$F = C_A ma + C_H L^2 \sqrt{\pi \rho \mu} \int_0^t \frac{a(t')}{\sqrt{t-t'}} dt' \quad (41)$$

They empirically derived their added mass and history force coefficients, $$C_A = 1.05 - \frac{0.066}{Ac^2 + 0.12} \text{ and } C_H = 2.88 + \frac{3.12}{(Ac + 0.12)^3}; \quad (42)$$

where $$Ac = \frac{v^2}{ad},$$

the ratio or convective acceleration to local acceleration (Odar & Hamilton, 1964), and L is a length scale pertaining to the size of the body (e.g. bike+rider).

Similar empirical correlations can be obtained experimentally through wind tunnel testing and employed in the present invention in order to estimate "added mass" effects on the drag coefficient.

Further Details and Uses

Embodiments of the present invention may incorporate or be coupled to one or more actuators. The processing circuitry may transmit control signals to the actuators to implement a change based on current sensor reading.

For example, a servo motor and actuator may be actuated based on sensor readings. As another example, an actuator which is configured to perform an energy efficiency pitch change operation or a safety operation such as a stabilization operation may be provided. The actuator may be controlled using feedback from the sensor, according to a particular feedback control approach.

In some embodiments, the apparatus is configured to measure attributes such as aerodynamic drag, drive train loss, rolling resistance and wind speeds (directions, bursts and gusts) at a given frequency, for example 10 times per second, and data can be provided based on such measurements substantially immediately. The apparatus may be configured can communicate to a user interface directly through a wire or remotely to several actuators such as servo motors, safety shutdown controllers, pressure pumps, redirection vents, air flow fins, etc. Communication may be via Bluetooth™, for example. In some embodiments, control of the actuators may provide for increased fluid-dynamic performance or another purpose.

Figure 8A:
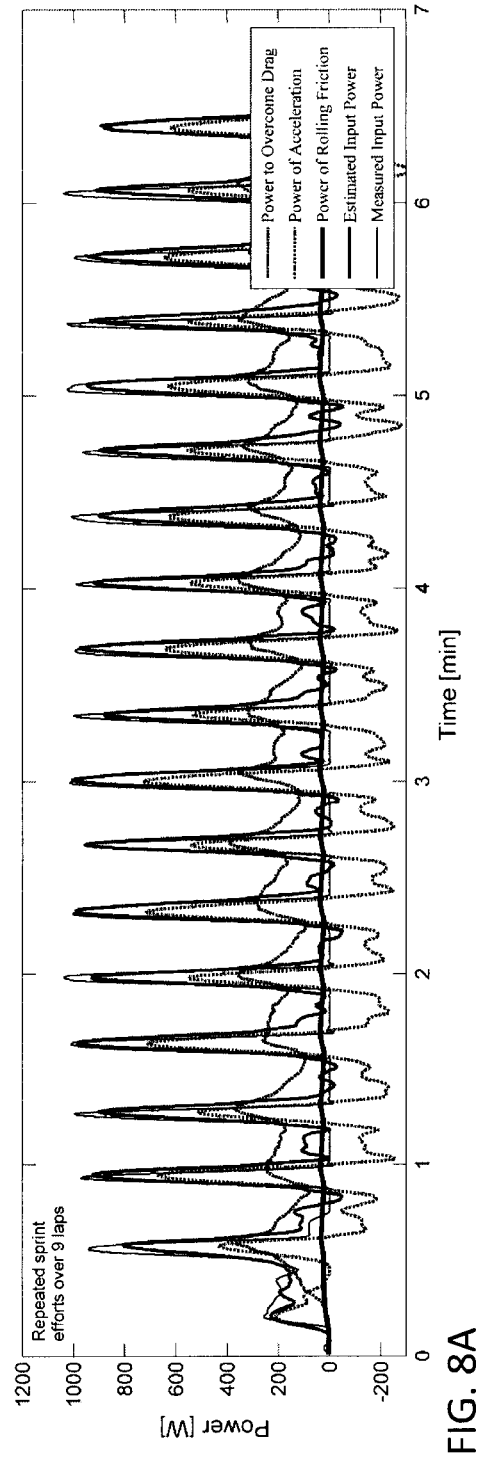
FIGS. 8A and 8B illustrate test data showing a correlation between power output and drag according to an embodiment of the present invention.
Figure 8B:
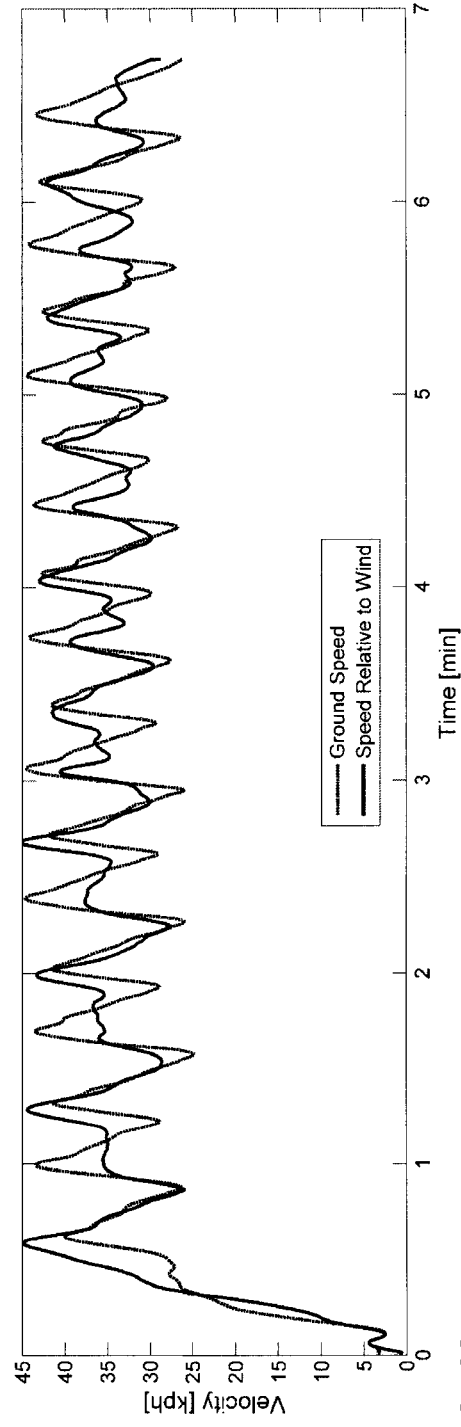

FIGS. 8A and 8B illustrates test data showing a correlation between power output and drag according to an embodiment of the present invention. For this embodiment, a bicycle rider moved from a seated position to a standing position and then performed an acceleration. The results shown in FIGS. 8A and 8B illustrate that the measured peak power on each burst is consistently higher than the estimated peak power. In particular, the average measured peak power is 994 W compared to an estimated power of 930 W, corresponding to a reduction in power of 7%. In other words, if the rider was to remain in the seated position, the same performance could be achieved with a reduction in power of 7%. This result provides direct insight into the aerodynamic performance of the burst accelerations. Note, however, it is likely impossible for the rider to produce the same power from a seated position when compared to standing. Nevertheless, it is worthwhile for the rider to consider alternative sprinting positions in order to converge on an optimal combination of aerodynamics and power production.

Figure 9A:
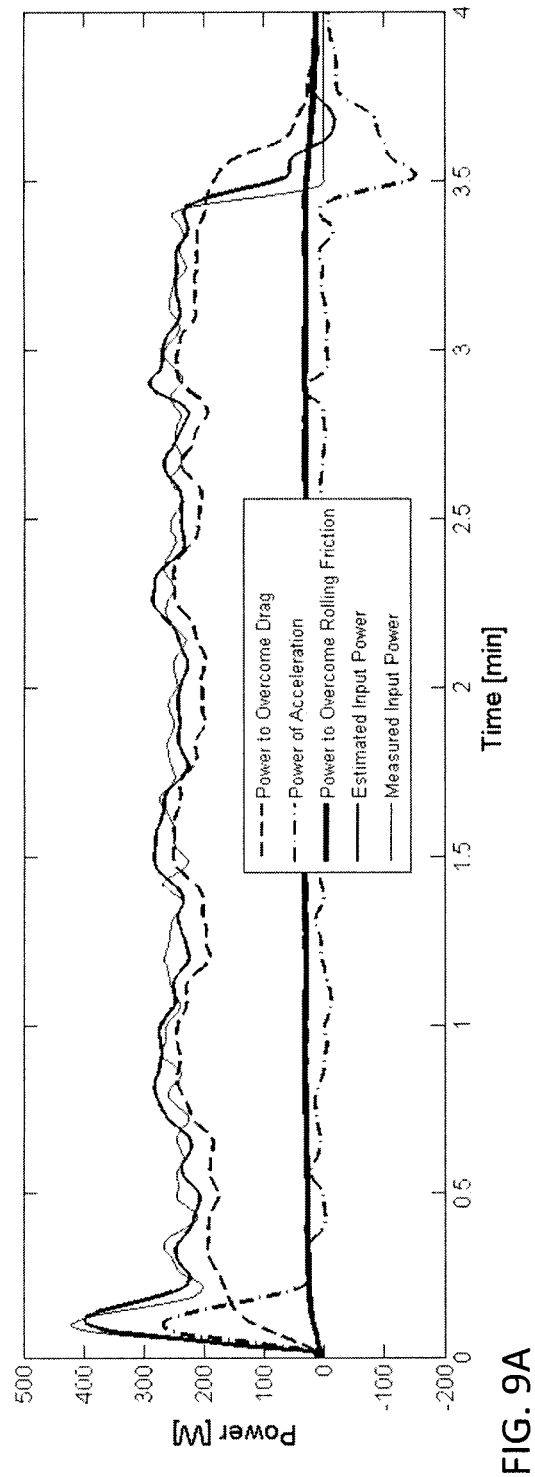
FIGS. 9A and 9B illustrate additional test data showing variation in estimated and measured input power and velocity over time, according to an embodiment of the present invention.
Figure 9B:
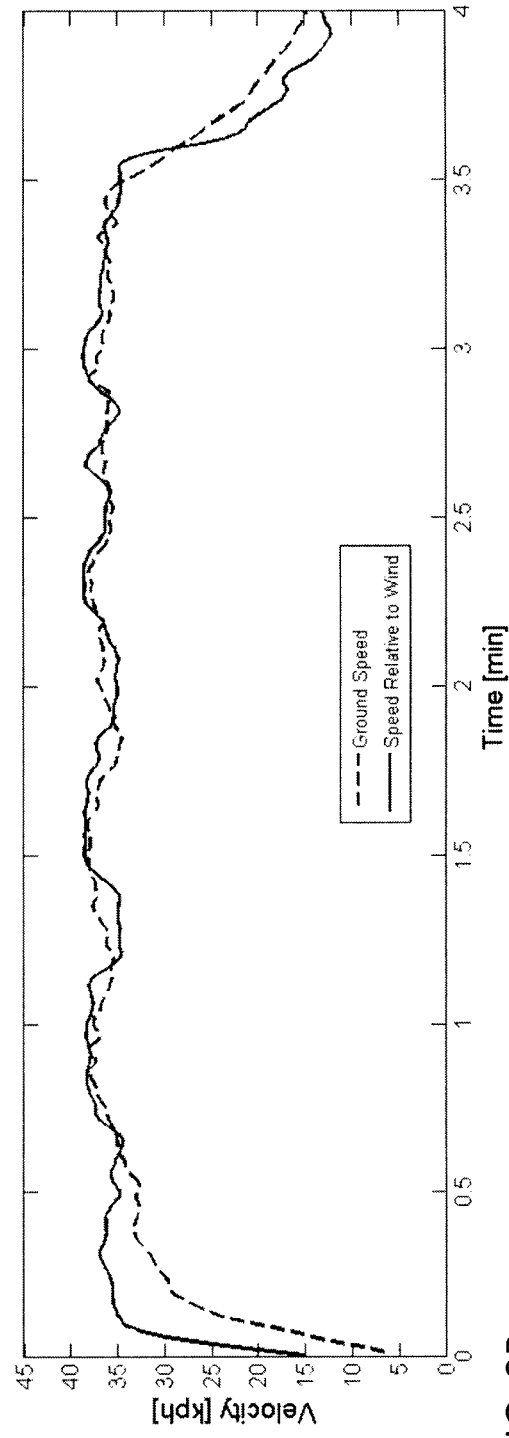

FIGS. 9A and 9B illustrates typical variations of four parameters for a small segment of a controlled ride in an outdoor velodrome, according to an experiment conducted in relation to an embodiment of the present invention. The four parameters include: (i) the power to overcome drag force, (ii) the power to overcome road slope, (iii) the power of acceleration, and (iv) the power to overcome rolling resistance. The total rider input power can be equated with the sum of all forces acting on the rider, multiplied by the rider ground speed.

For the illustrated small segment, the test rider was instructed to hold a constant power of approximately 250 W over 5 laps. The rider begins with an aggressive acceleration reaching a peak power of about 400 W (red line in FIG. 9A). The sensor data indicates that the power required to accelerate the rider peaks at slightly under 300 W (green line in FIG. 9A). When combined with the power to overcome drag (black line in FIG. 9A) and the rolling resistance (blue line in FIG. 9A), the estimated rider power is well predicted. Following the initial acceleration, the rider stabilizes his input power at roughly 250 W. Over the course of the 5 laps (t=0.25 to 3.5 in FIGS. 9A and 9B), both the measured input power and estimated input power fluctuate slightly, but for different reasons. The measured power is fluctuating as the riders power transfer from his legs, through into the pedals will be impossible to keep perfectly constant. On the other hand, the estimated power fluctuates due to changes in the sensor measurements and associated estimates of power, particularly changes in relative wind speed (FIG. 9B) and small changes in the rider's acceleration (FIG. 9A). Overall, the average power and RMS power during the quasi-steady interval between t=0.25 min and t=3.5 min is: P(measured) =248.62 W; P(estimated)=249.10 W; $P_{RMS}$(measured) =11.21 W; and $P_{RMS}$(estimated)=19.73 W.

The results indicate that on the average, the experimental embodiment could be used to accurately measure the riders input power under controlled conditions. This also suggests that the sensor measurements being provided have a reasonable accuracy. Using these sensor readings, a calibration has been established for the rider. When the rider chooses a different body position, his fluid-dynamic performance under varying conditions can be compared with this calibration.

Figure 10:
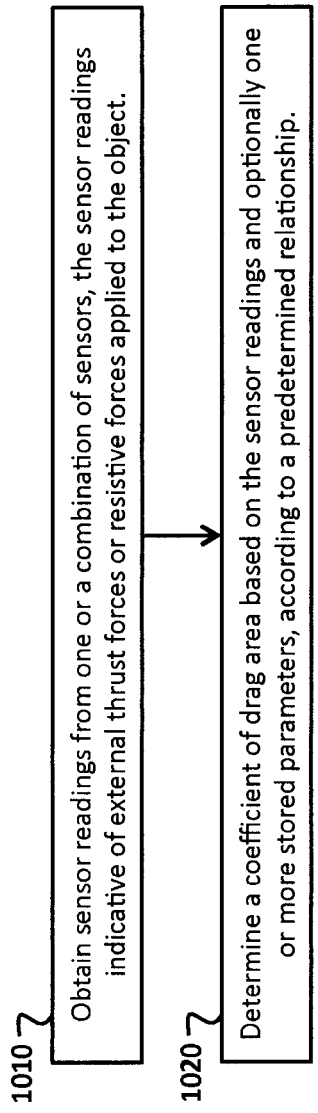
FIG. 10 illustrates a method for determining fluid dynamic drag on an object, in accordance with an embodiment of the present invention.

FIG. 10 illustrates a method for determining fluid dynamic drag on an object, in accordance with an embodiment of the present invention. The method includes obtaining 1010 sensor readings from one or a combination of sensors, the sensor readings indicative of external thrust forces or resistive forces applied to the object. The method includes determining 1020 using a computer, a coefficient of drag area based on the sensor readings and optionally one or more stored parameters, according to a predetermined relationship.

Figure 11:
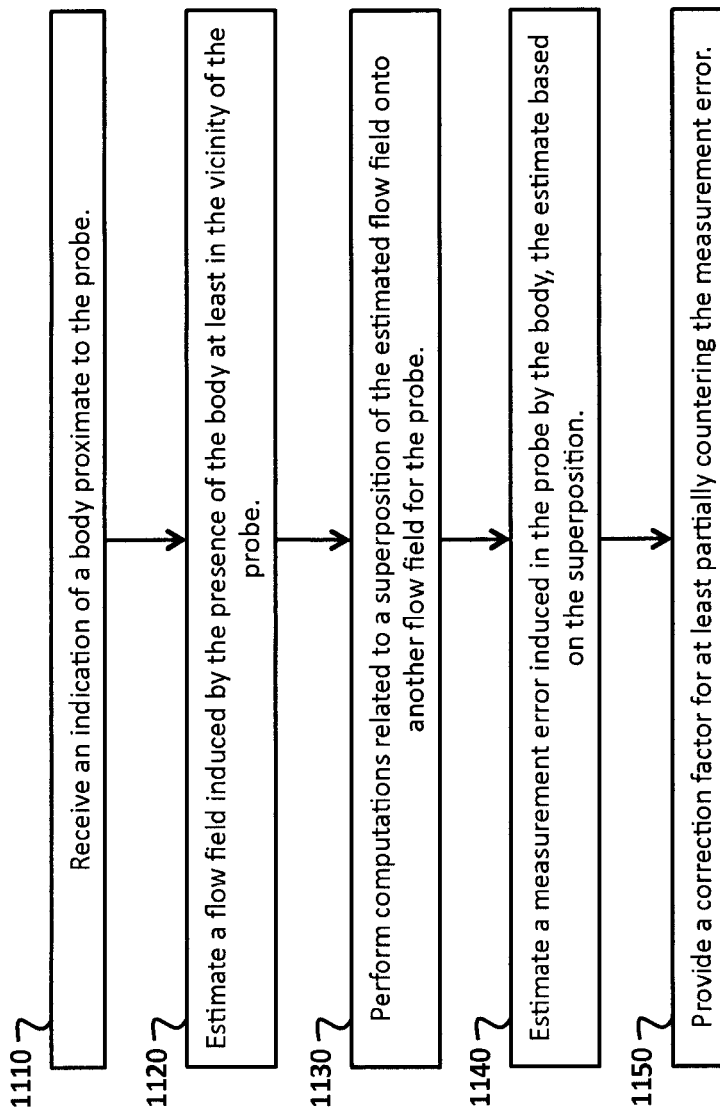
FIG. 11 illustrates a method for calibrating a multi-hole pitot probe wind sensor, in accordance with an embodiment of the present invention.

FIG. 11 illustrates a method for calibrating a multi-hole pitot probe wind sensor, in accordance with an embodiment of the present invention. The method includes receiving 1110 an indication of a body proximate to the probe; estimating 1120 a flow field induced by the presence of the body at least in the vicinity of the probe; performing 1130 computations related to a superposition of the estimated flow field onto another flow field for the probe; estimating 1140 a measurement error induced in the probe by the body, the estimate based on the superposition; and providing 1150 a correction factor for at least partially countering the measurement error.

Figure 12:
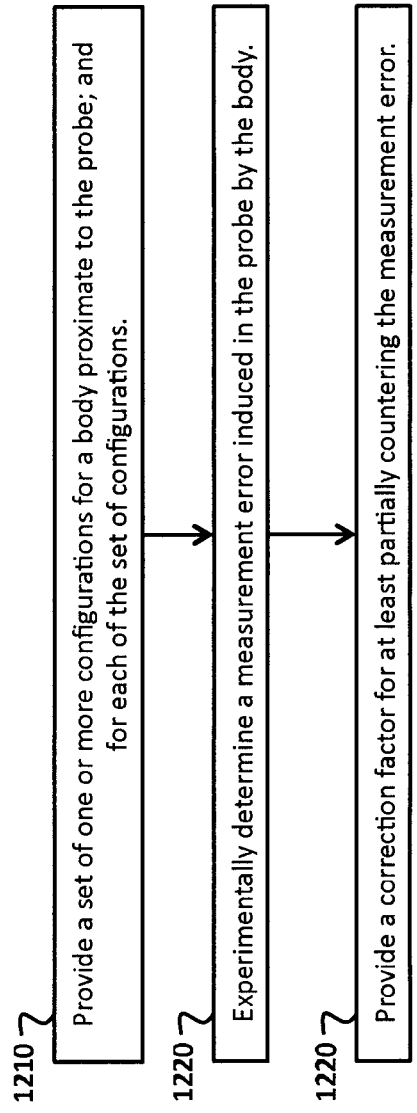
FIG. 12 illustrates a method for calibrating a multi-hole pitot probe wind sensor, in accordance with another embodiment of the present invention.

FIG. 12 illustrates a method for calibrating a multi-hole pitot probe wind sensor, in accordance with another embodiment of the present invention. The method includes providing 1210 a set of one or more configurations for a body proximate to the probe; and for each of the set of configurations, experimentally determining 1220 a measurement error induced in the probe by the body and providing 1230 a correction factor for at least partially countering the measurement error.

Figure 13:
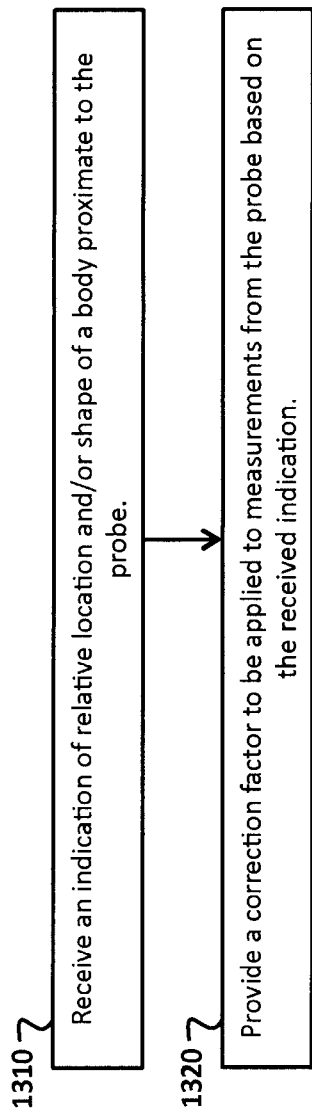
FIG. 13 illustrates a method for operating a multi-hole pitot probe wind sensor, in accordance with an embodiment of the present invention.

FIG. 13 illustrates a method for operating a multi-hole pitot probe wind sensor, in accordance with an embodiment of the present invention. The method includes receiving 1310 an indication of relative location and/or shape of a body proximate to the probe; and providing 1320 a correction factor to be applied to measurements from the probe based on the received indication.

Figure 14:
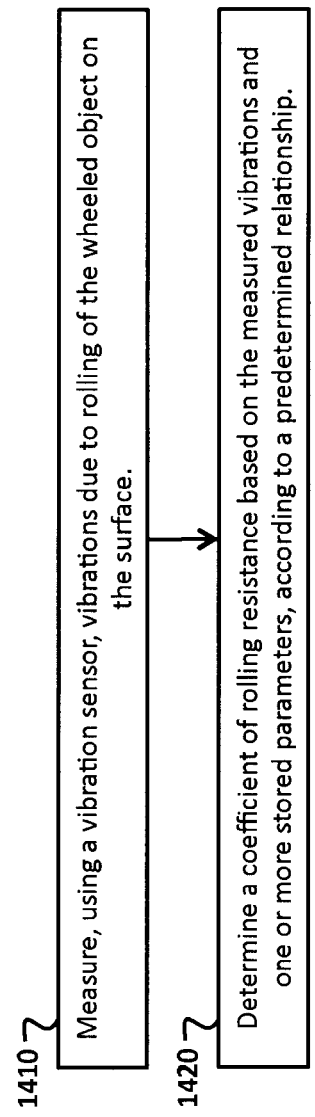
FIG. 14 illustrates a method for determining rolling resistance exerted by a surface on a wheeled object, in accordance with an embodiment of the present invention.

FIG. 14 illustrates a method for determining rolling resistance exerted by a surface on a wheeled object, in accordance with an embodiment of the present invention. The method includes measuring 1410, using a vibration sensor, vibrations due to rolling of the wheeled object on the surface; and determining 1420, using a computer, a coefficient of rolling resistance based on the measured vibrations and one or more stored parameters, according to a predetermined relationship.

Embodiments of the present invention may be applied in the field of consumer sports equipment. For example, the apparatus may be configured as a cycling computer or monitor for use by a person or a human-powered vehicle.

Embodiments of the present invention may be applied in the transportation field. For example, trucking companies may incorporate the apparatus on transportation trucks to monitor vehicle efficiency, for example incorporating fluid-dynamic analysis. In one embodiment, the apparatus is integrated into other systems on the truck such as truck tire inflating systems, which are presently manually adjusted by the driver. The present invention may be configured for mitigating issues such as tire wear, managing tire safety pressures for both highway blowouts and providing better traction in certain road conditions such as on mountain passes.

Embodiments of the present invention may be applied in the field of renewable wind energy. The apparatus may be configured and incorporated into wind turbines to facilitate monitoring and adjustment thereof, for example as a safety and performance enhancement sensor. One or more of the outputs of the apparatus may be used for pitch blade adjustment, and/or force safety sensors. Embodiments of the present invention may be configured to support oscillating wind technology, also known as vortex wind turbines.

Embodiments of the present invention may be applied in the field of aviation, for example providing a sensor for use by private and recreational pilots. The apparatus may be incorporated into light aircraft, gliders, unmanned aerial vehicles, and/or as a backup sensor.

For example, light aircraft often rely on a single pitot-tube sensor. This sensor often does not have a backup system. If the pitot-tube sensor becomes obstructed or damaged, it can lead the pilot to a stall situation. The majority of crashes happen on the landing approach when reported speeds are incorrect. Hang gliding also has potential to stall, or worst have a "Whip Kick" or Whip Stall", which is dangerous and often ends in a crash. The present invention may be configured to emit a warning signal upon detection of incipient stall conditions.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method for determining a fluid dynamic coefficient of drag area on an object, comprising:
    obtaining sensor readings from one or a combination of sensors, the sensor readings indicative of external thrust forces applied to the object, object speed, resistive forces applied to the object, or a combination thereof, the sensor readings further indicative of air speed, air direction, or both;
    receiving, by a computer, an indication of a body proximate to a pitot probe;
    by the computer: estimating a flow field induced by a presence of the body at least in a vicinity of the pitot probe; performing computations related to a superposition of the estimated flow field onto another flow field for the pitot probe; estimating a measurement error induced in the pitot probe by the body, the estimate based on the superposition; and providing a correction factor for at least partially countering the measurement error; and
    determining, using the computer, the coefficient of drag area based on the sensor readings.

2. The method of claim 1, wherein the coefficient of drag area varies over time due to changing shape of the object.

3. The method of claim 1, wherein the object is a wheeled object and wherein the sensor readings are indicative of a coefficient of rolling resistance exerted by the surface on the wheeled object, the coefficient of rolling resistance used in determining the coefficient of drag area.

4. The method of claim 3, wherein determining the coefficient of rolling resistance comprises:
- measuring, using a vibration sensor, vibrations due to rolling of the wheeled object on the surface;
- determining, using the computer, the coefficient of rolling resistance based on the measured vibrations and one or more stored parameters, according to a predetermined relationship.

5. The method of claim 1, wherein the sensor readings are indicative of acceleration of wind incident on the object, the method further comprising processing the sensor readings indicative of acceleration of wind to determine an additional drag component on the object due to work being performed on air to accelerate said air around the object.

6. The method of claim 1, wherein the indication of the body proximate to the pitot probe is received from one of the combination of sensors.

7. The method of claim 1, comprising determining, using the computer, the coefficient of drag area based on the sensor readings in combination with one or more stored parameters, according to a predetermined relationship.

8. The method of claim 1, wherein the one or a combination of sensors are the pitot probe which is a multi-hole pitot probe comprising at least a first pitot tube, a second pitot tube, and a third pitot tube, each pitot tube having a respective pressure port, the pressure ports facing in different directions;
- a first differential pressure transducer operatively coupled to the first pitot tube and the second pitot tube for providing a first measurement of differential pressure between the first pitot tube and the second pitot tube; and
- a second differential pressure transducer operatively coupled to the first pitot tube and the third pitot tube for providing a second measurement of differential pressure between the first pitot tube and the third pitot tube.

9. An apparatus for determining a fluid-dynamic coefficient of drag area on an object, comprising:
- a set of sensors configured to provide sensor readings indicative of air speed, air direction, or both air speed and air direction relative to the object and further indicative of external thrust forces applied to the object, object speed, resistive forces applied to the object, or a combination thereof, the set of sensors including a pitot probe configured to provide the sensor readings indicative of air speed, air direction, or both air speed and air direction relative to the object; and
- processing circuitry operatively coupled to the set of sensors, the processing circuitry configured to determine the coefficient of drag area based on the sensor readings, the processing circuitry further configured to:
  - receive an indication of a body proximate to the pitot probe;
  - estimate a flow field induced by a presence of the body at least in a vicinity of the pitot probe;
  - perform computations related to a superposition of the estimated flow field onto another flow field for the pitot probe;
  - estimate a measurement error induced in the pitot probe by the body, the estimate based on the superposition; and
  - provide a correction factor for at least partially countering the measurement error; and
- an interface configured to provide the determined coefficient of drag area to a user.

10. The apparatus of claim 9, wherein the coefficient of drag area varies over time due to changing shape of the object.

11. The apparatus of claim 9, wherein the object is a wheeled object rolling on a surface, the apparatus further comprising:
- a vibration sensor configured to measure vibrations due to rolling of the wheeled object on the surface;
- wherein the processing circuitry is operatively coupled to the vibration sensor, the processing circuitry further configured to determine a coefficient of rolling resistance based on the measured vibrations and one or more stored parameters, according to a predetermined relationship.

12. The apparatus of claim 9, wherein the set of sensors include one or more sensors configured to obtain one of the sensor readings being indicative of acceleration of wind incident on the object, and wherein the processing circuitry is further configured to process the sensor readings indicative of acceleration of wind to determine an additional drag component on the object due to work being performed on air to accelerate said air around the object.

13. The apparatus of claim 9, wherein the indication of the body proximate to the pitot probe is received from one of the combination of sensors.

14. The apparatus of claim 9, wherein the object is a wheeled object and wherein the sensor readings are indicative of a coefficient of rolling resistance exerted by the surface on the wheeled object, the coefficient of rolling resistance used in determining the coefficient of drag area.

15. The apparatus of claim 9, wherein the processing circuitry is configured to determine the coefficient of drag area based on the sensor readings in combination with one or more stored parameters, according to a predetermined relationship.

16. The apparatus of claim 9, wherein the sensor readings are indicative of air speed and direction relative to the object, wherein the pitot probe is a multi-hole pitot probe sensor for providing the sensor readings that are indicative of air speed and direction relative to the object, the multi-hole pitot probe sensor comprising:
- at least a first pitot tube, a second pitot tube and a third pitot tube, each pitot tube having a respective pressure port, the pressure ports facing in different directions;
- a first differential pressure transducer operatively coupled to the first pitot tube and the second pitot tube for providing a first measurement of differential pressure between the first pitot tube and the second pitot tube; and
- a second differential pressure transducer operatively coupled to the first pitot tube and the third pitot tube for providing a second measurement of differential pressure between the first pitot tube and the third pitot tube.

17. A method for calibrating a multi-hole pitot probe wind sensor mounted to a surface vehicle, comprising:
- providing a set of one or more configurations for a body proximate to the probe;
- for each of the set of configurations, experimentally determining a measurement error induced in the probe by the body and providing a correction factor for at least partially countering the measurement error, wherein the wind sensor is configured for measuring velocity and angle of wind relative to the surface vehicle and wherein the correction factor is applied to said measurements in velocity and angle of wind.

18. The method of claim 17, wherein the probe is a multi-hole pitot probe sensor for providing sensor readings that are indicative of air speed and direction relative to the object, the multi-hole pitot probe sensor comprising:

at least a first pitot tube, a second pitot tube and a third pitot tube, each pitot tube having a respective pressure port, the pressure ports facing in different directions;

a first differential pressure transducer operatively coupled to the first pitot tube and the second pitot tube for providing a first measurement of differential pressure between the first pitot tube and the second pitot tube; and a second differential pressure transducer operatively coupled to the first pitot tube and the third pitot tube for providing a second measurement of differential pressure between the first pitot tube and the third pitot tube.

* * * * *